Figure 38:
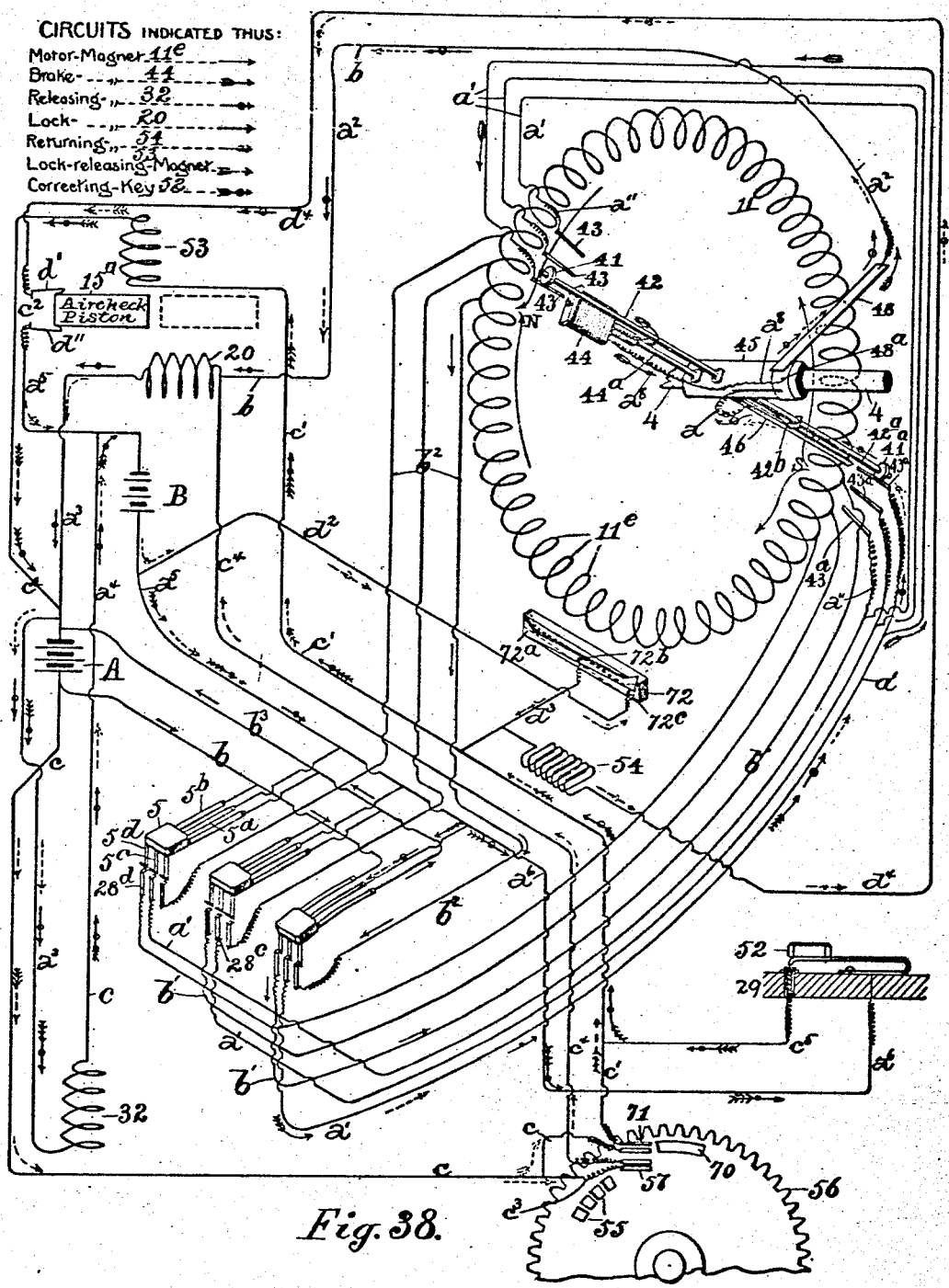

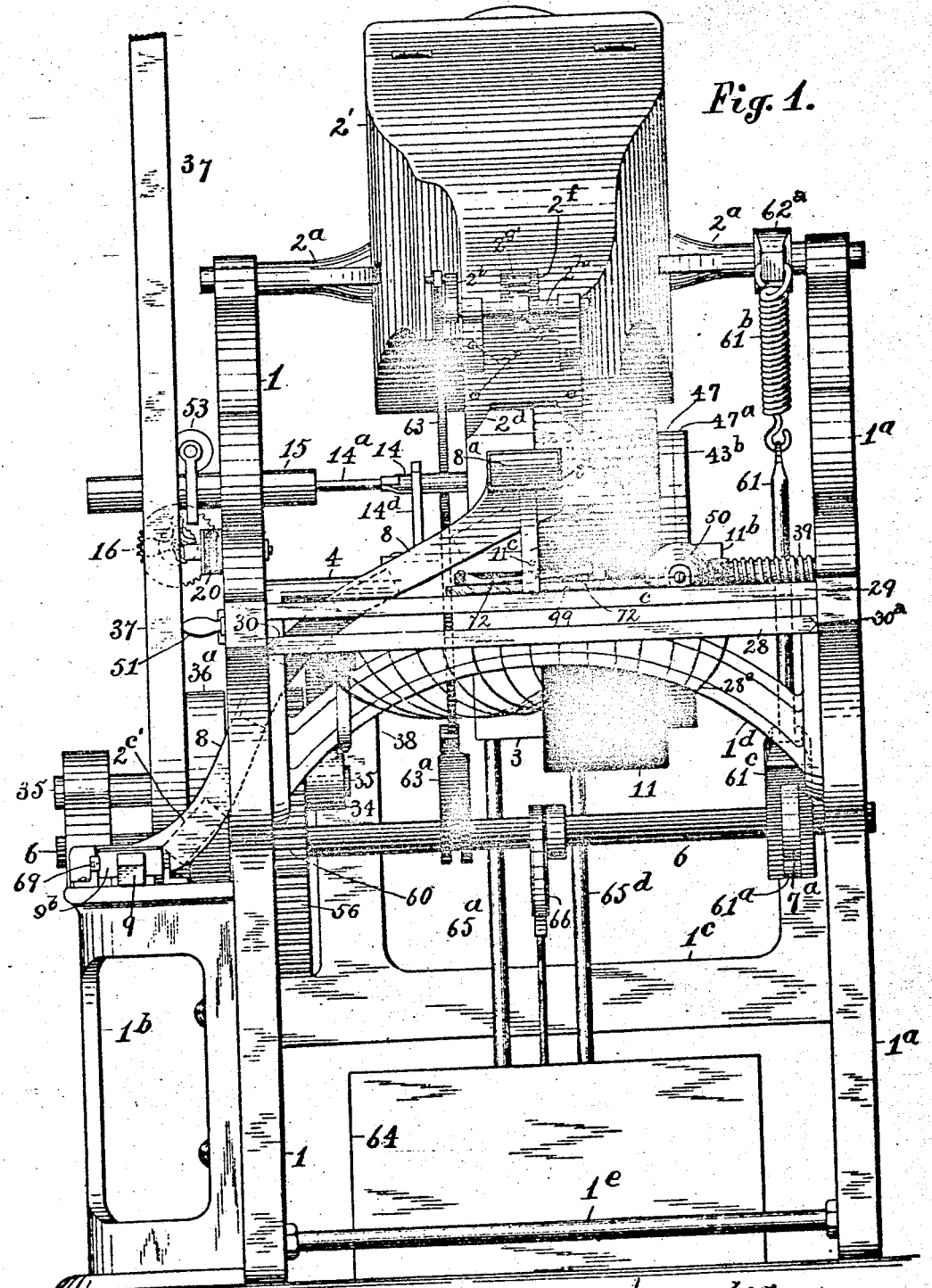

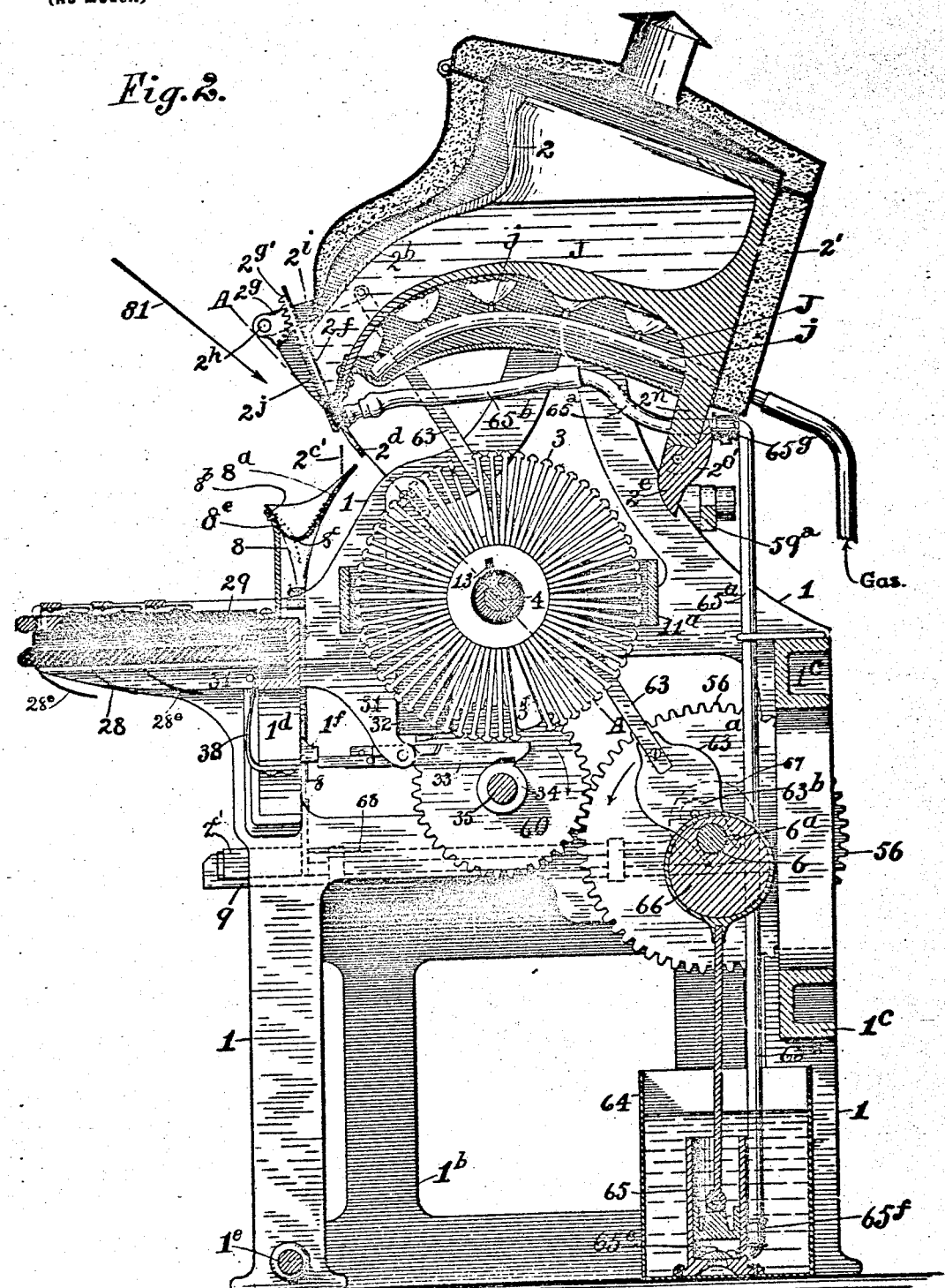

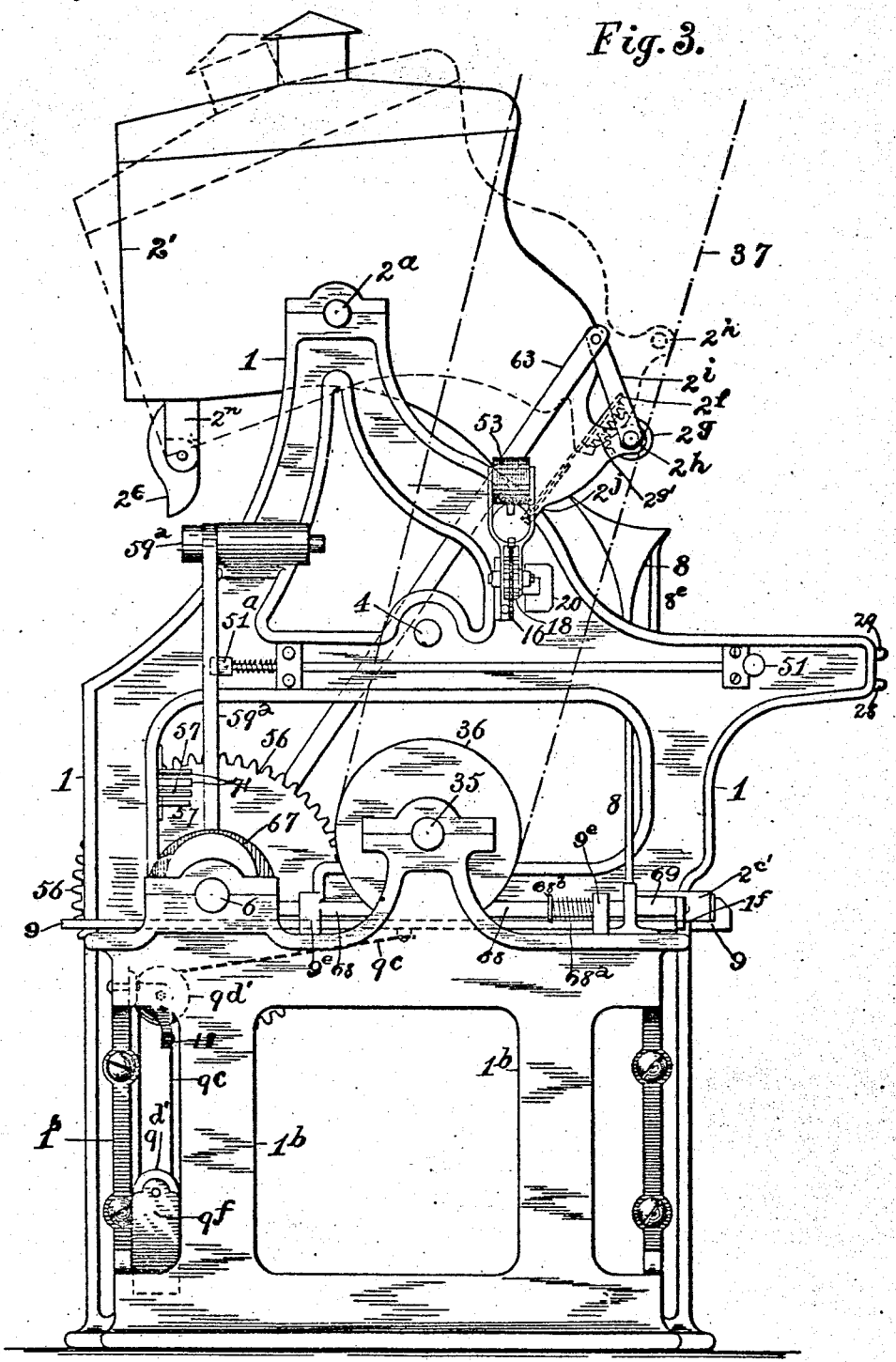

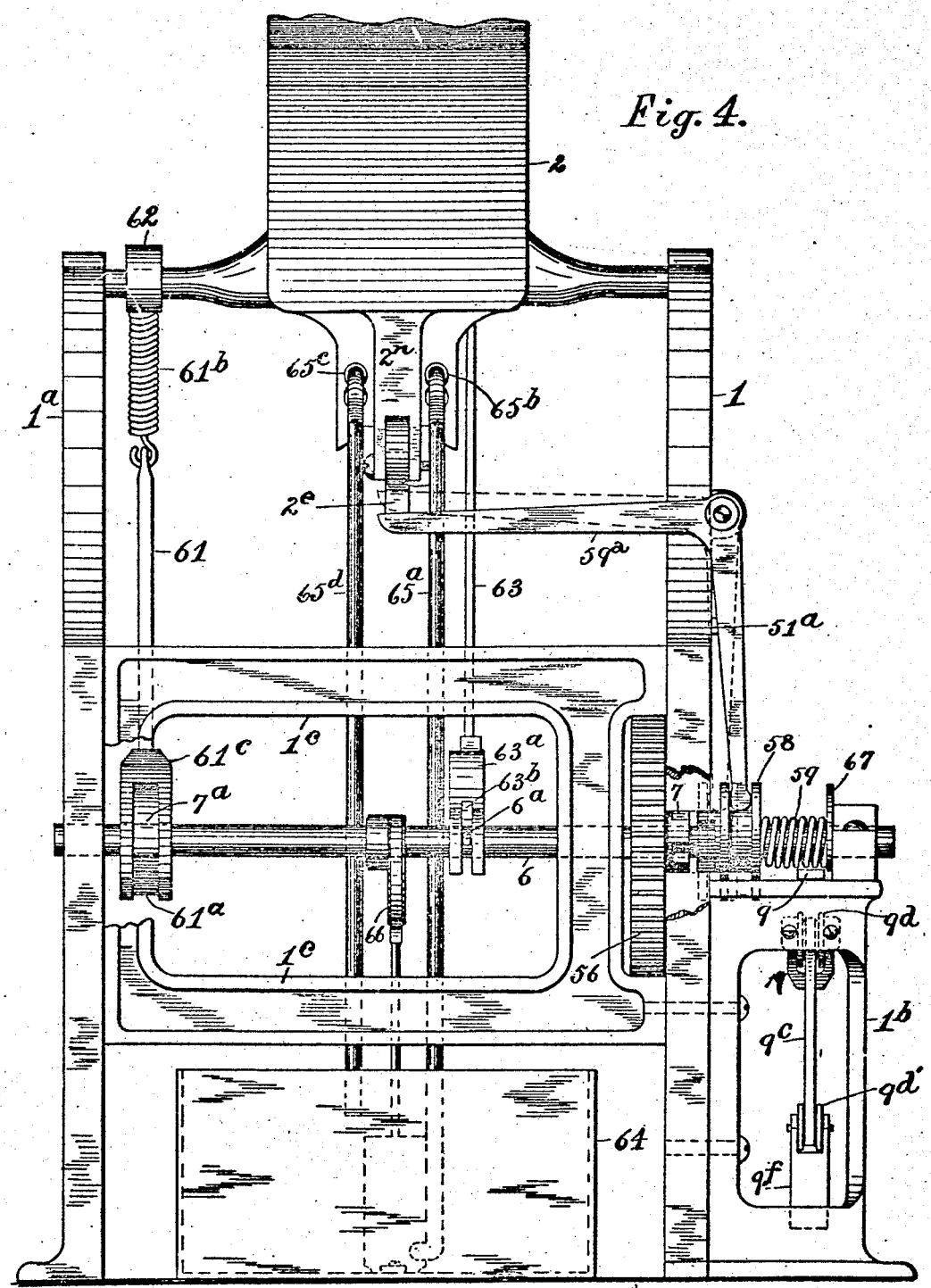

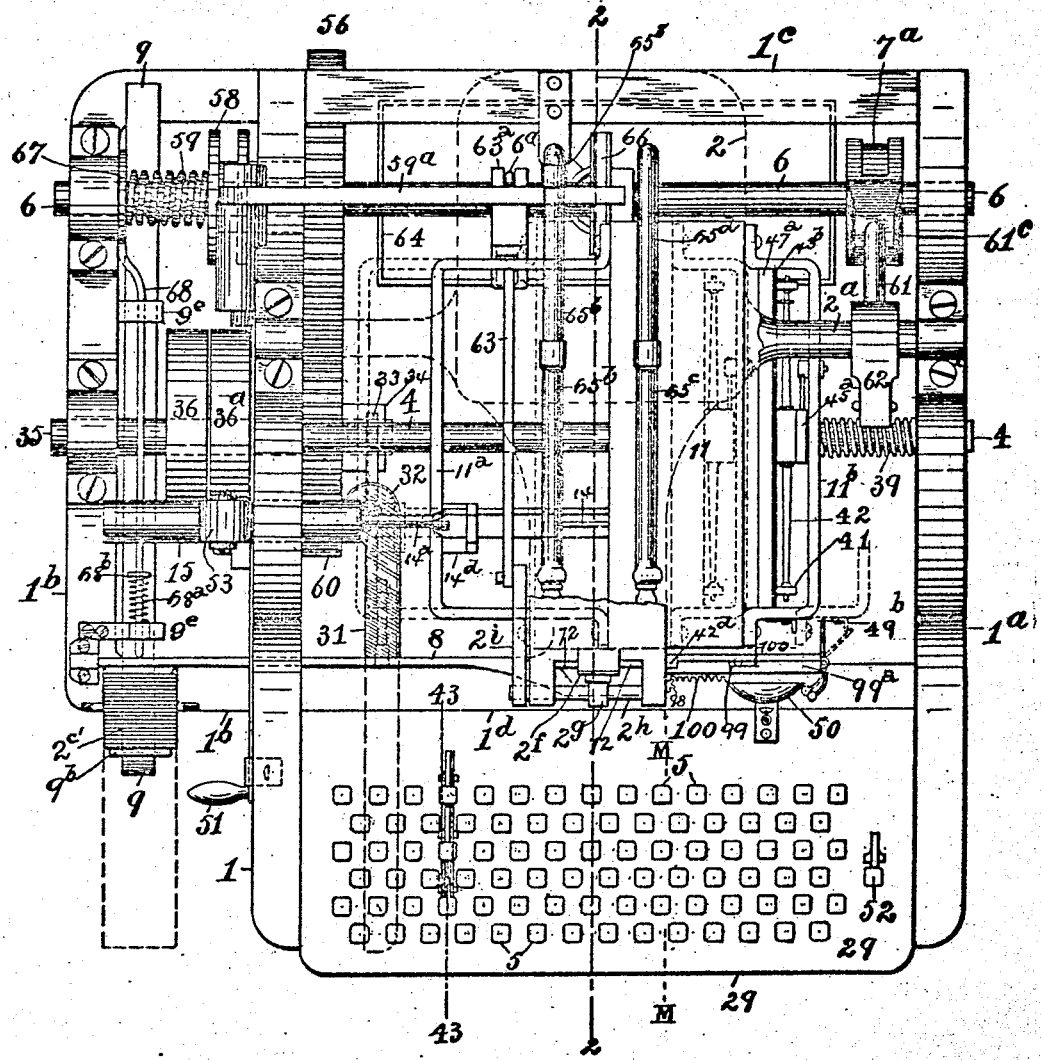

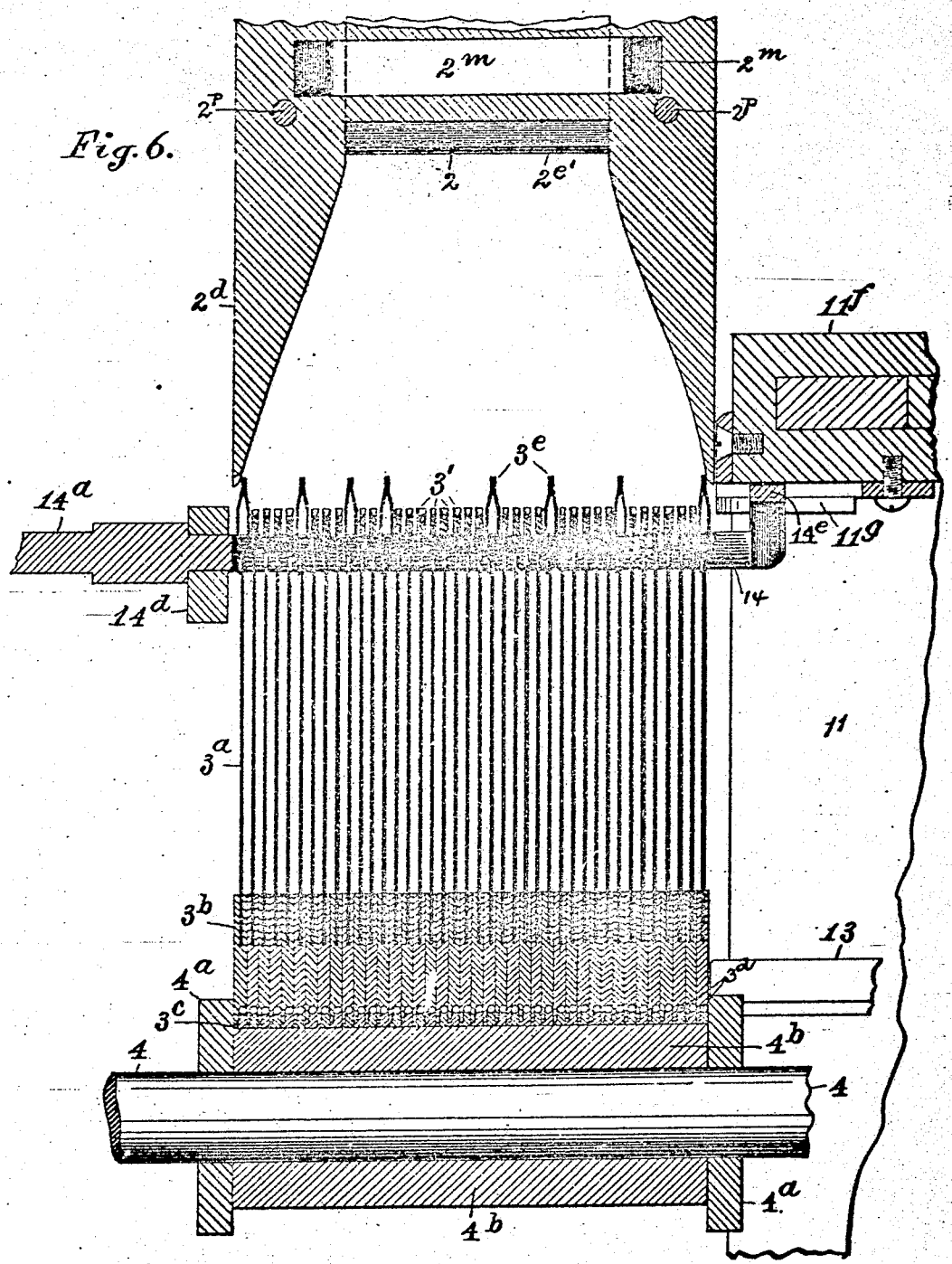

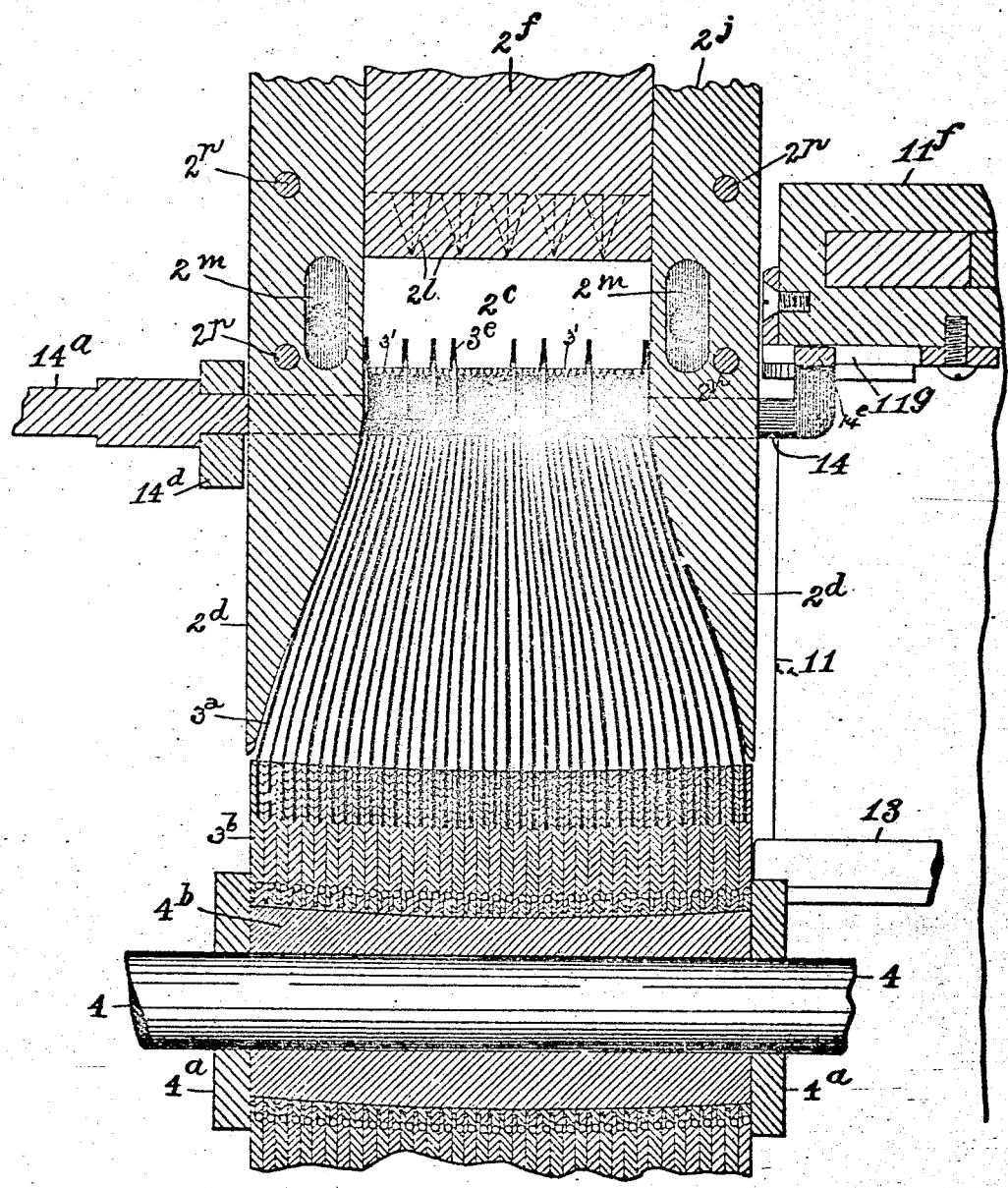

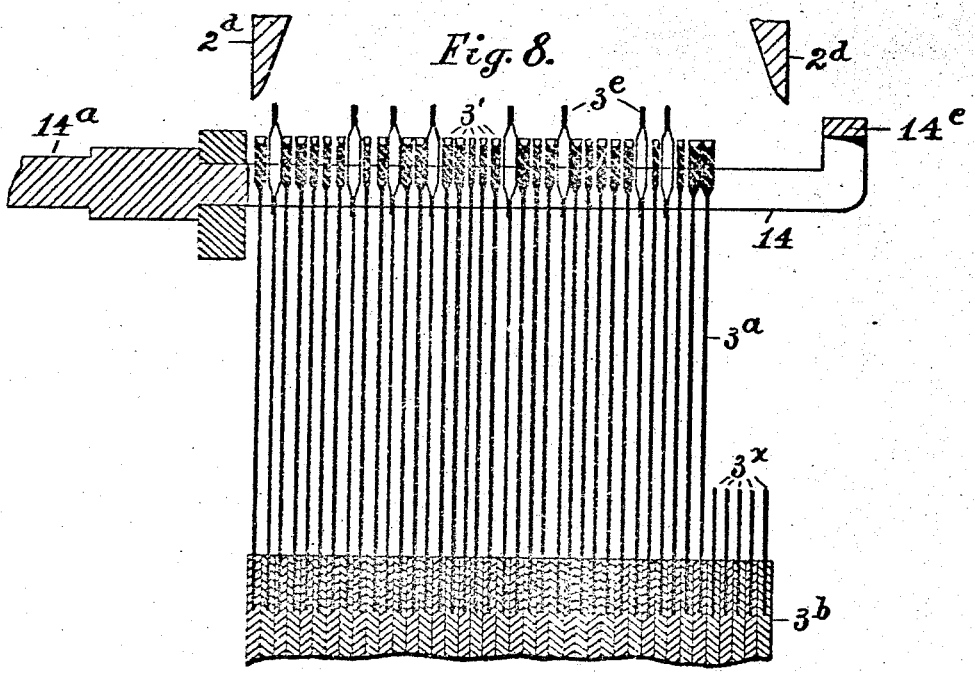
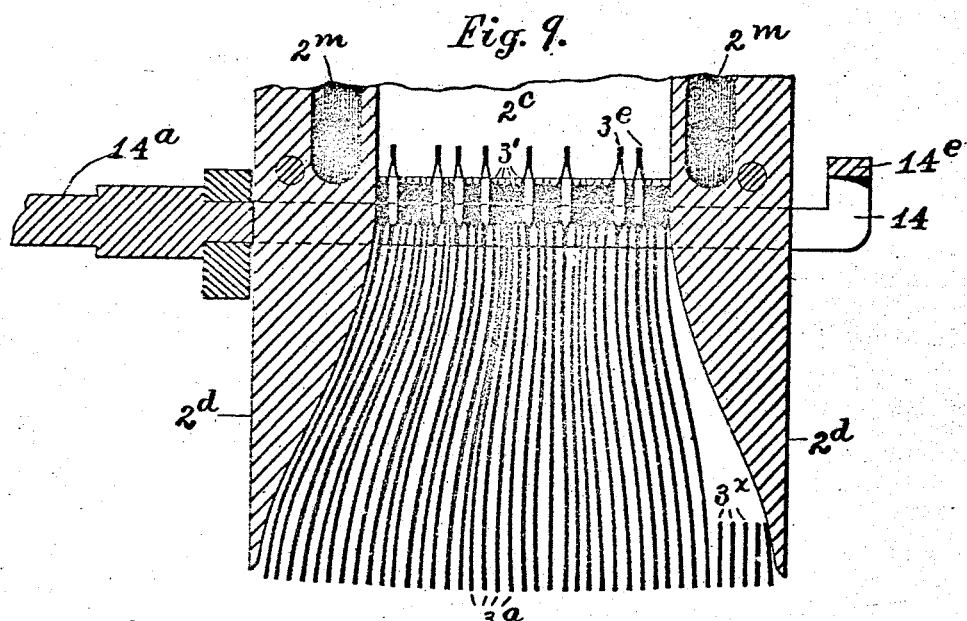

No. 660,263. Patented Oct. 23, 1900.
A. W. STORM.
ELECTRIC LINOTYPE MACHINE.
(Application filed Sept. 22, 1897.)
(No Model.) 19 Sheets—Sheet 9.
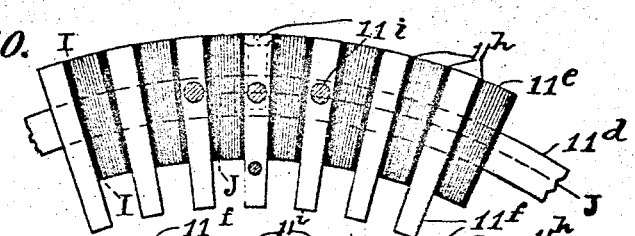
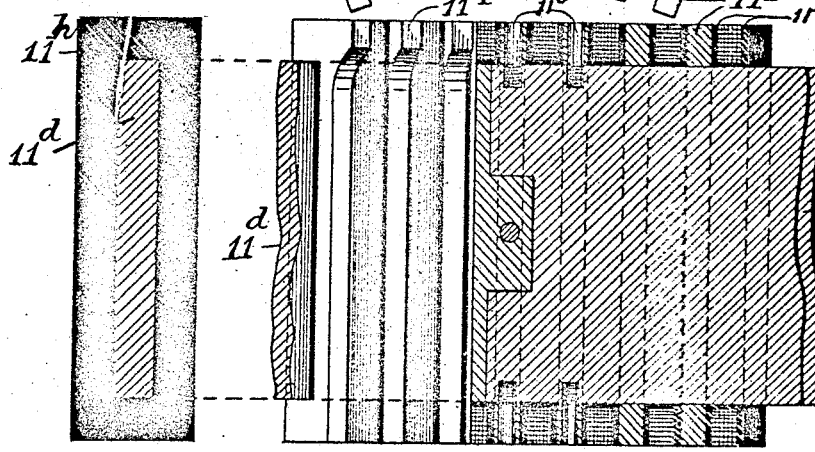
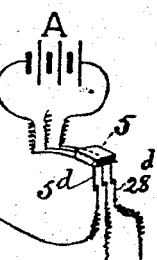
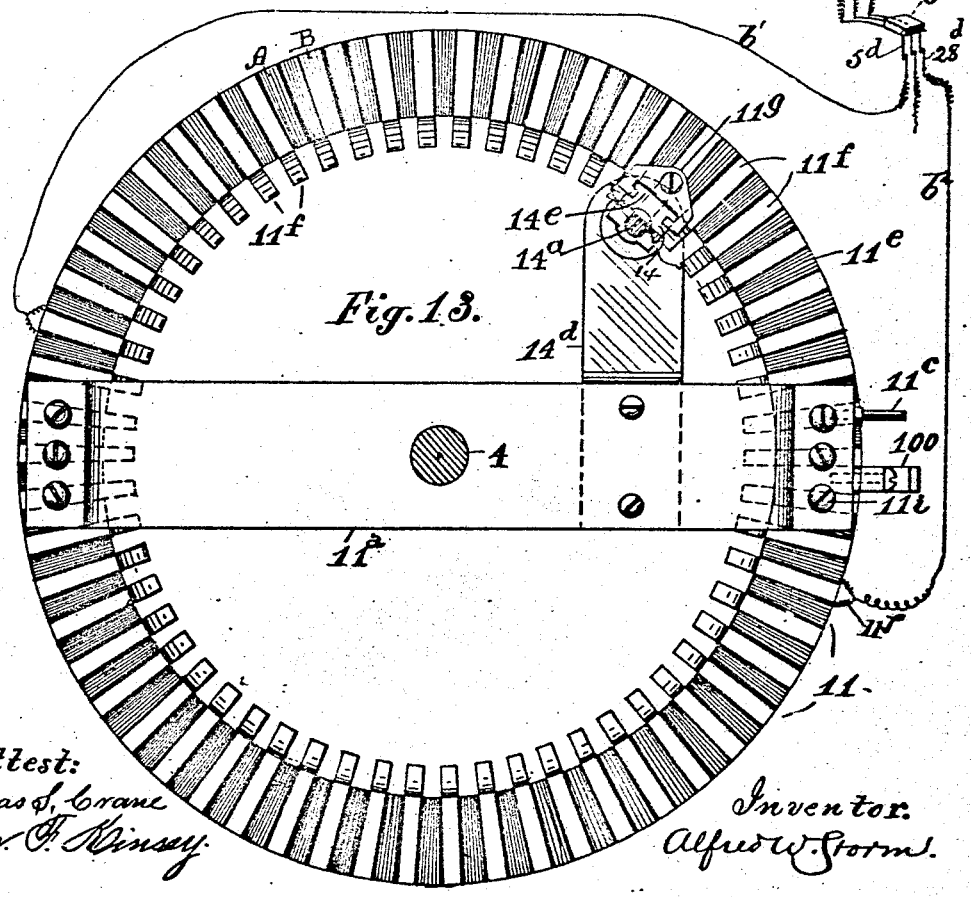
Attest:
Thomas F. Crane
Edw. F. Kinsey
Inventor:
Alfred W. Storm

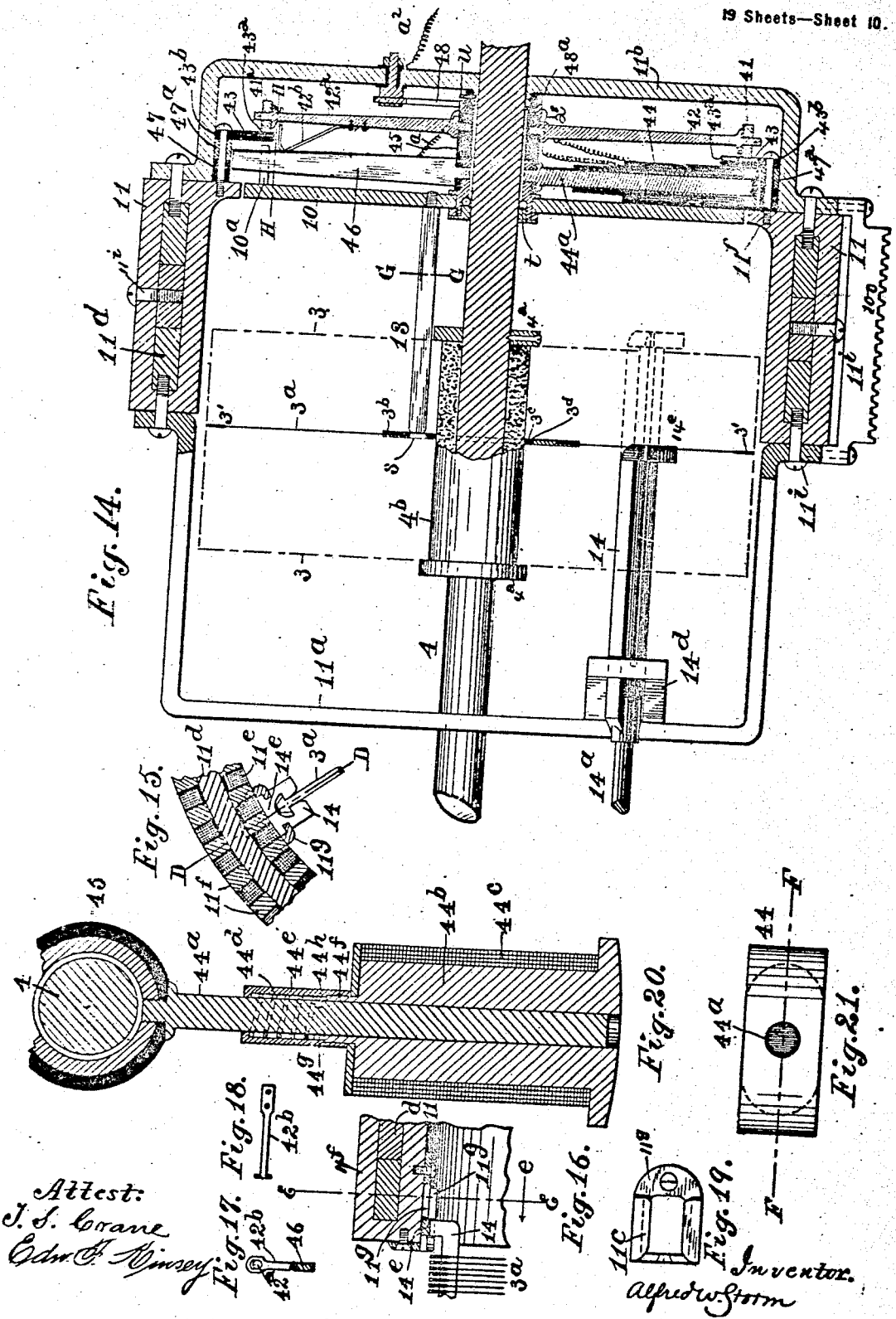

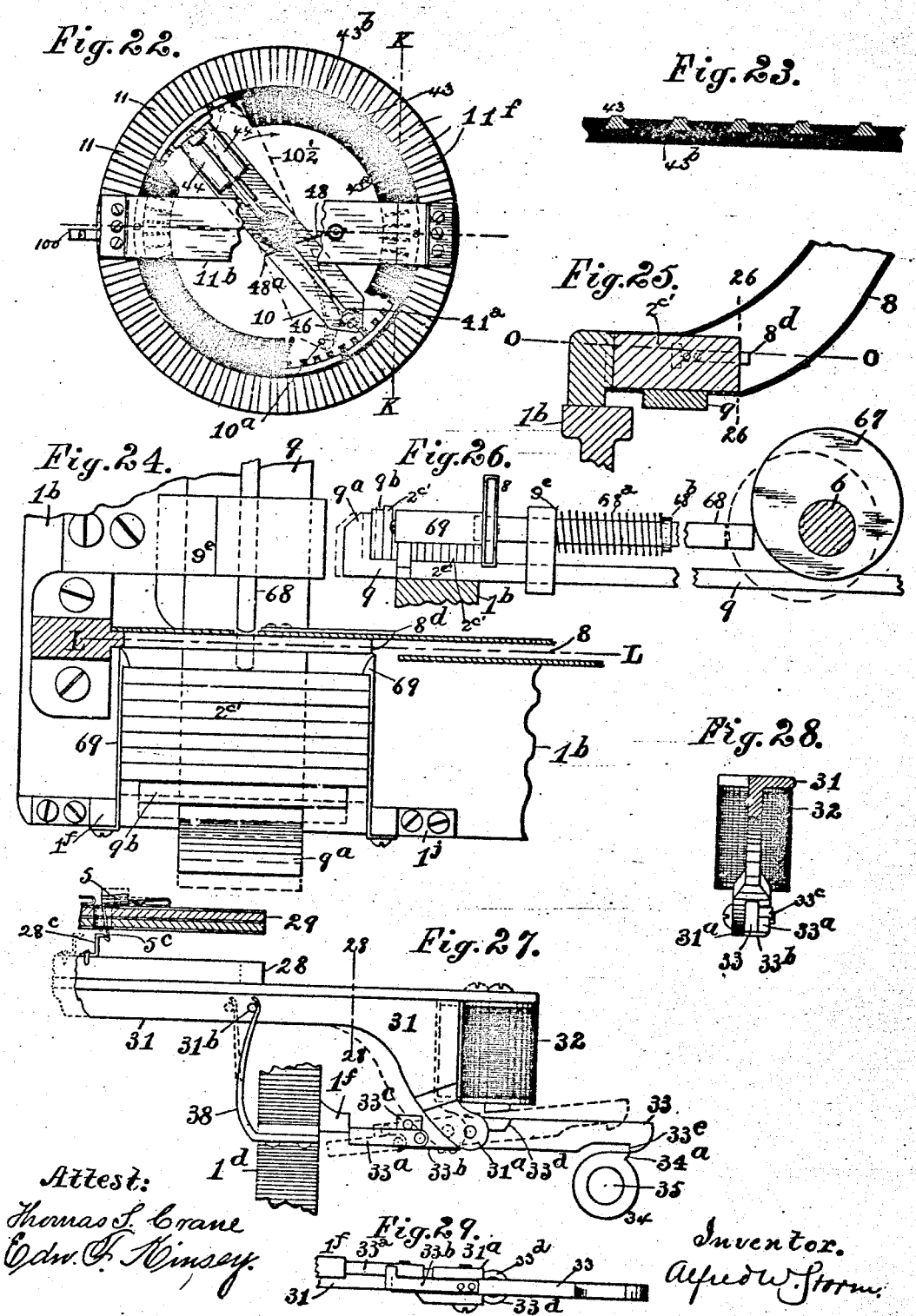

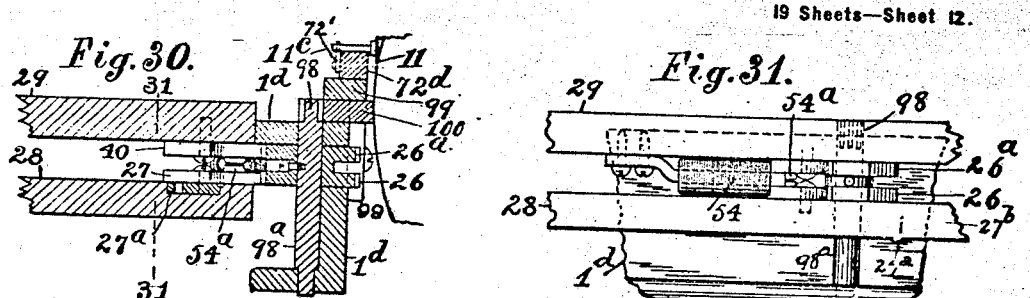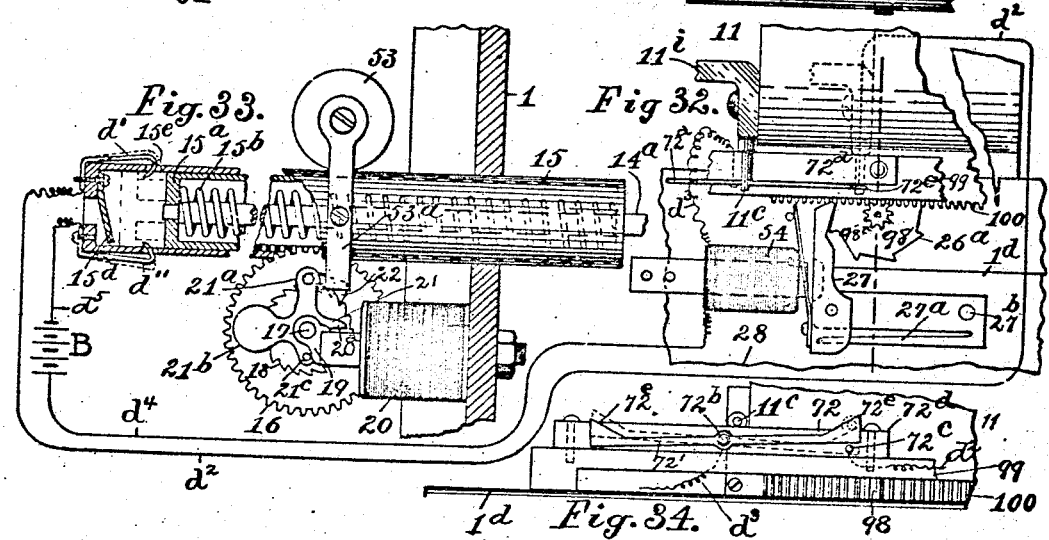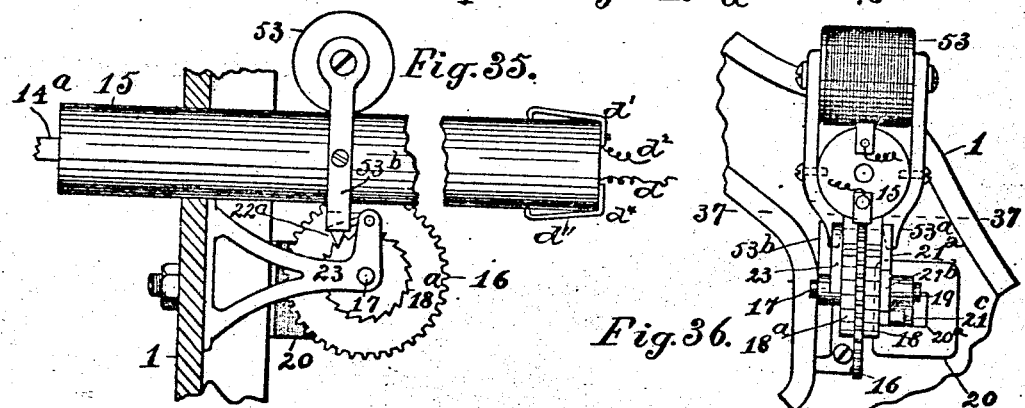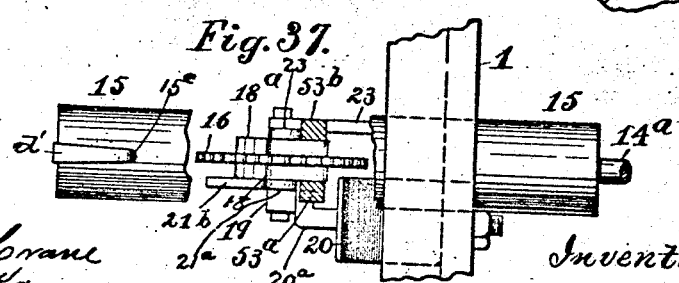

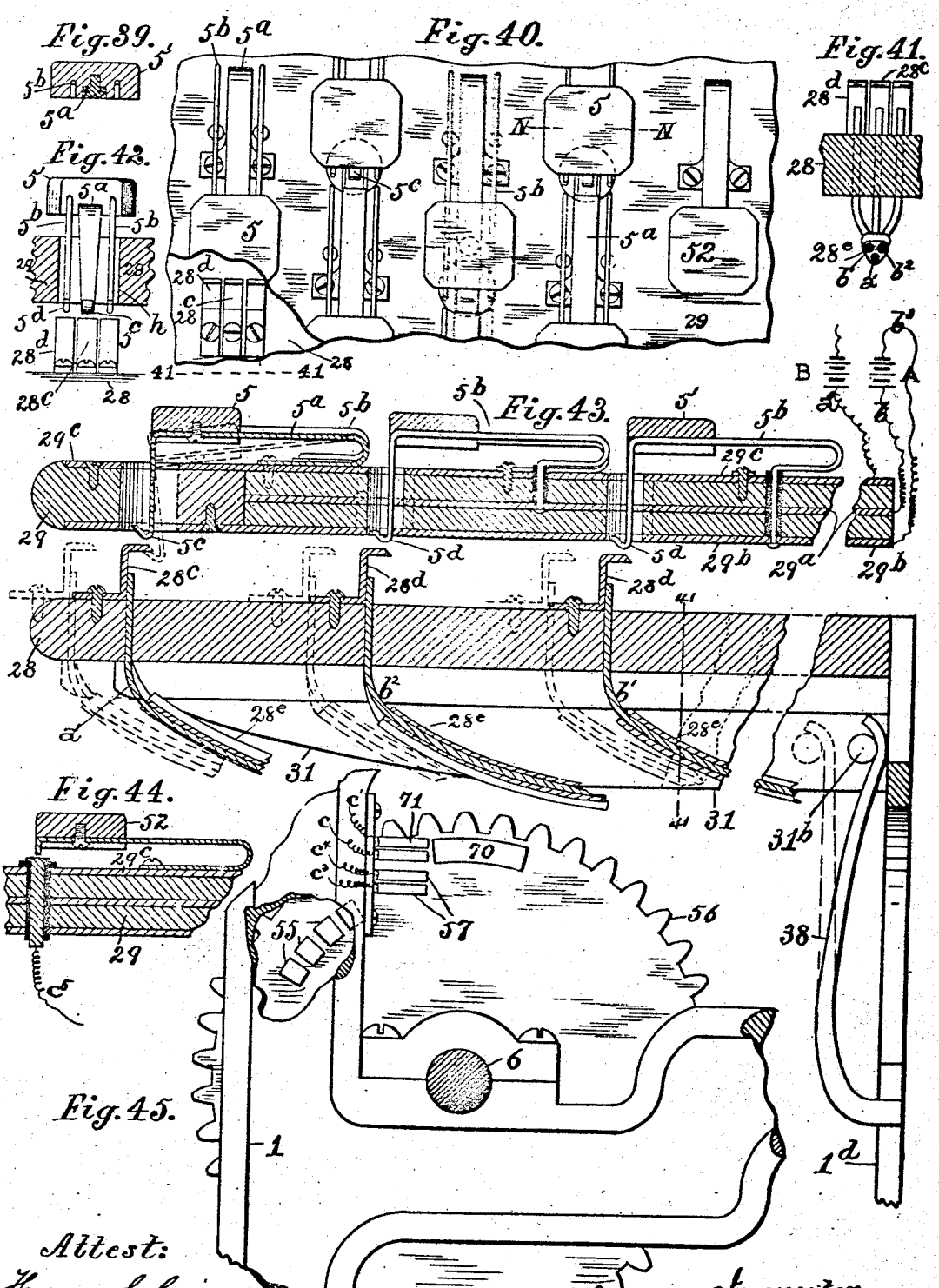

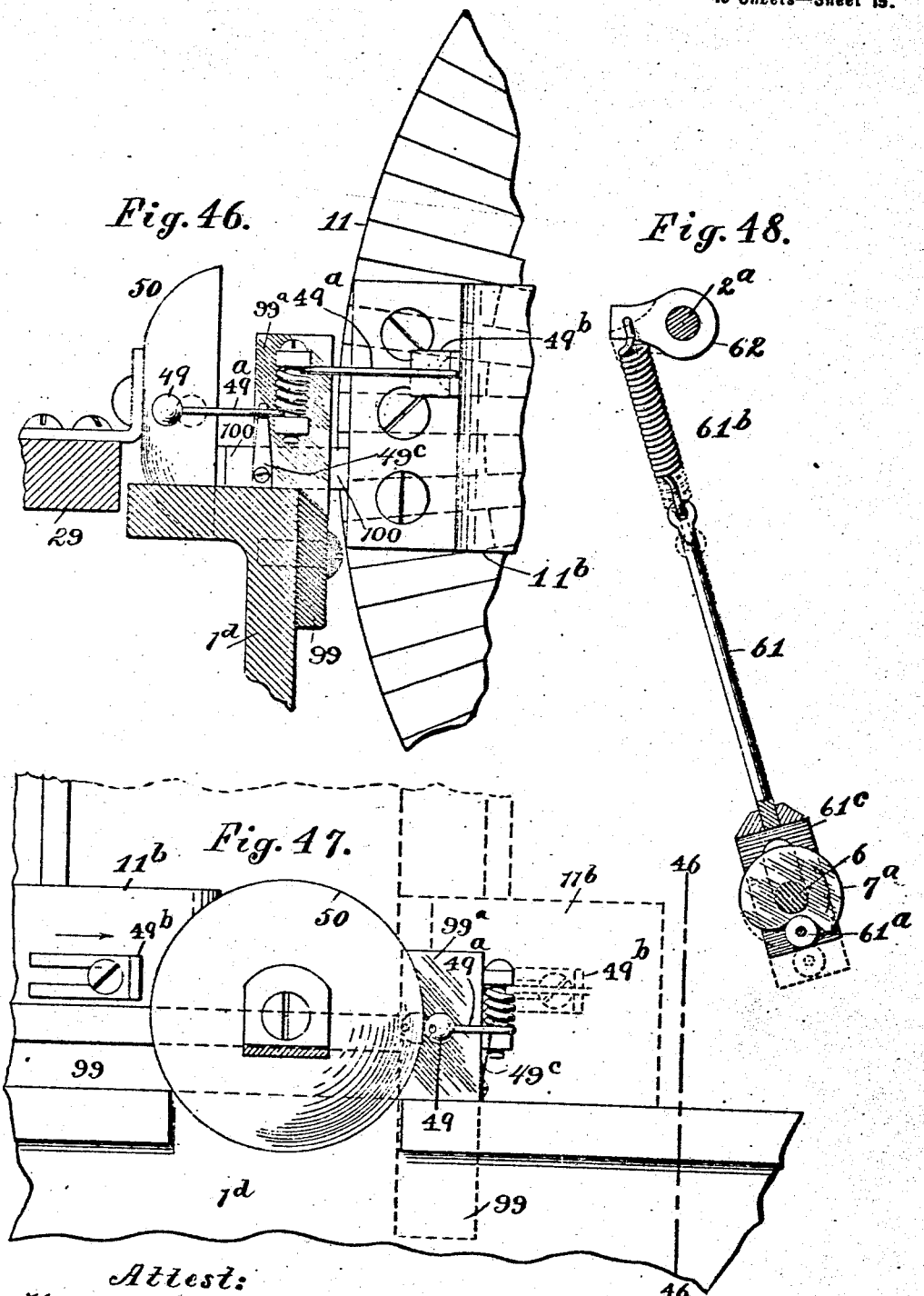

No. 660,263. Patented Oct. 23, 1900.
A. W. STORM.
ELECTRIC LINOTYPE MACHINE.
(Application filed Sept. 22, 1897.)
(No Model.) 19 Sheets—Sheet 16.
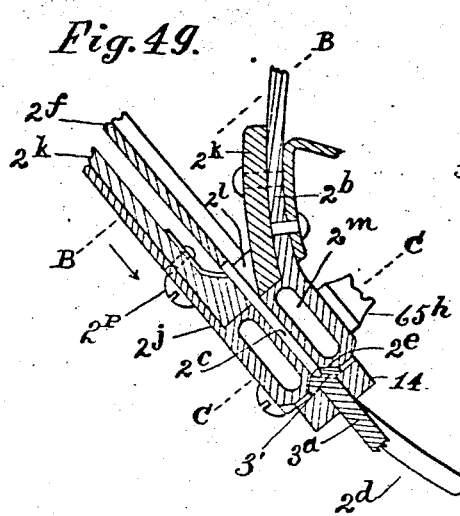
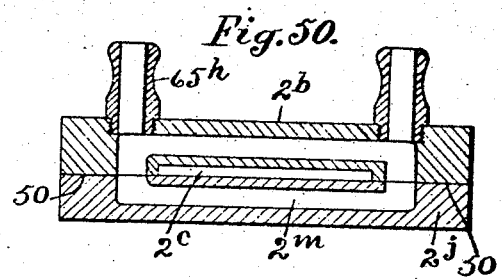
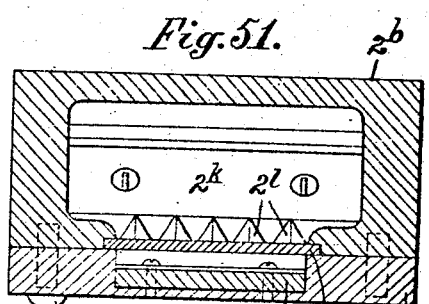
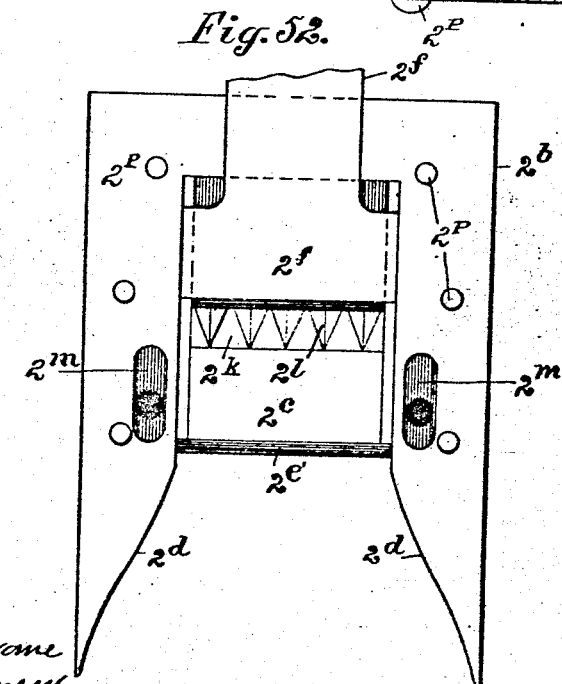
Attest:
Thomas J. Crane
Edw. F. Kinsey
Inventor.
Alfred W. Storm.

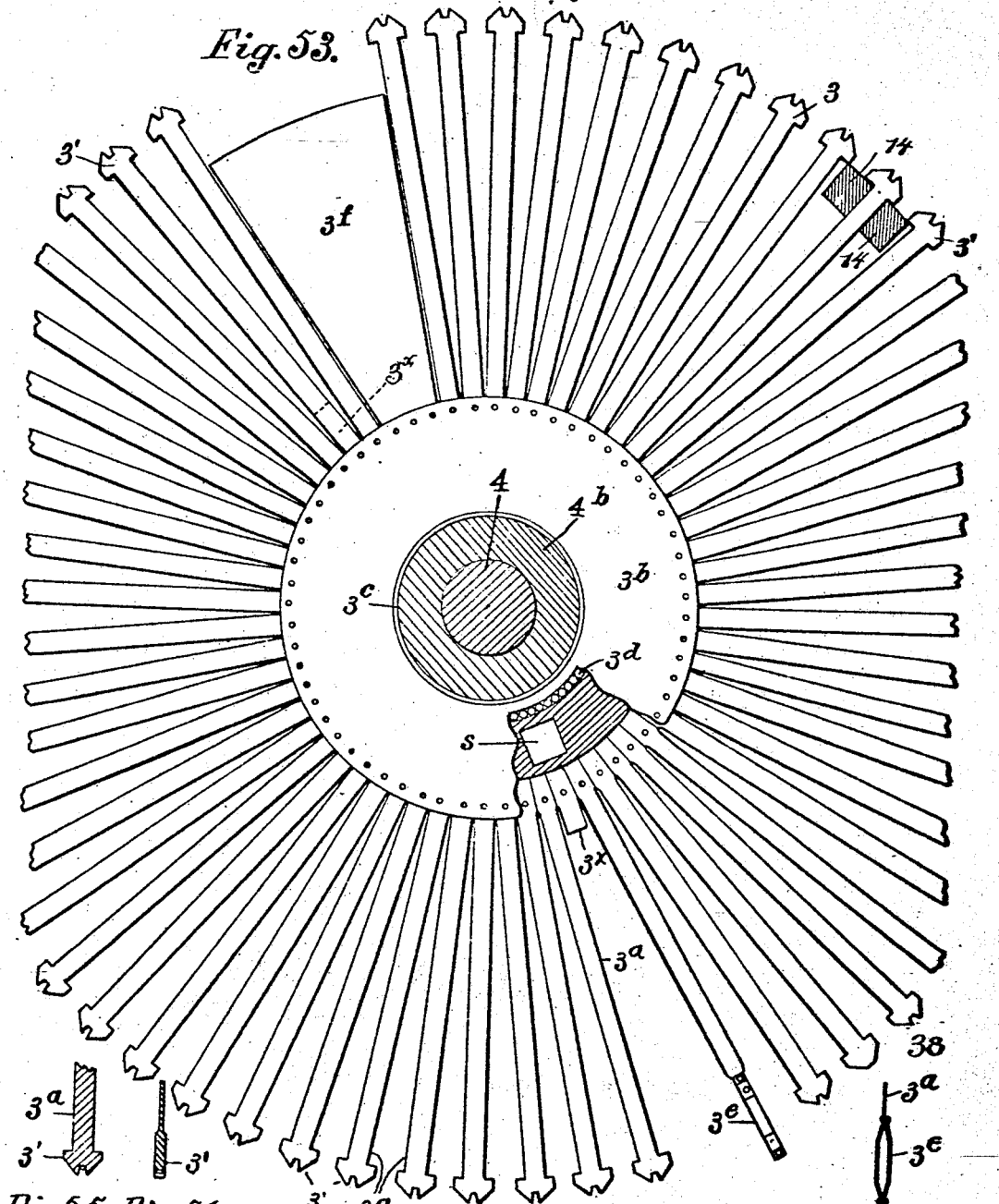

No. 660,263. Patented Oct. 23, 1900.
A. W. STORM.
ELECTRIC LINOTYPE MACHINE.
(Application filed Sept. 22, 1897.)
(No Model.) 19 Sheets—Sheet 18.
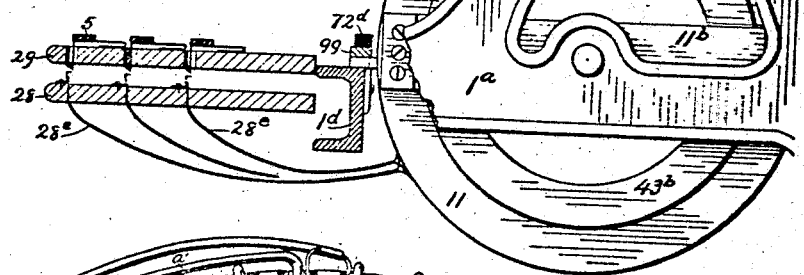
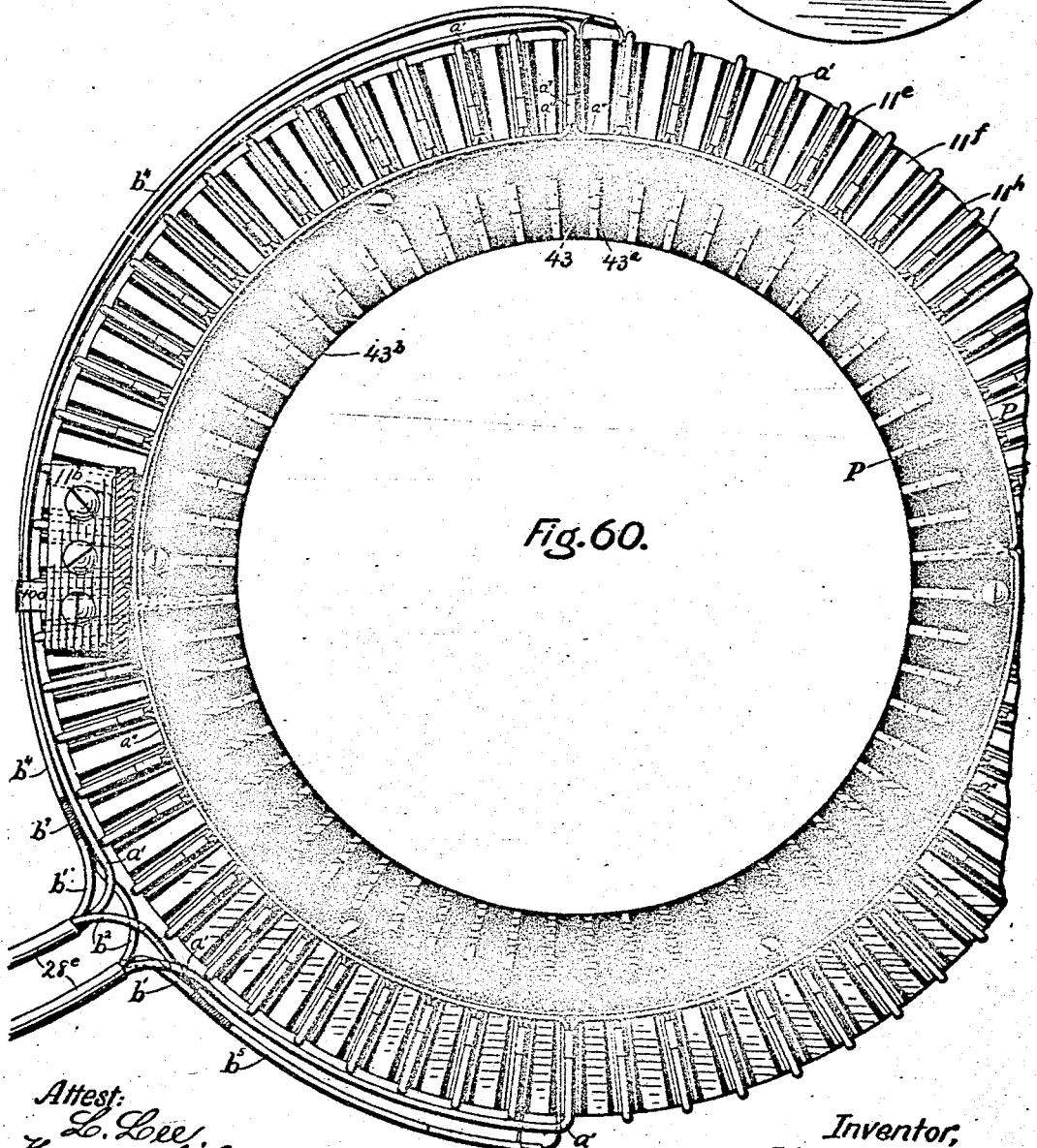
Attest:
L. Lee
Thomas S. Crane
Inventor,
Alfred W. Storm.

No. 660,263. Patented Oct. 23, 1900.
A. W. STORM.
ELECTRIC LINOTYPE MACHINE.
(Application filed Sept. 22, 1897.)
(No Model.) 19 Sheets—Sheet 19.

Attest:
L. Lee.
Thomas S. Crane

Inventor,
Alfred W. Storm.

UNITED STATES PATENT OFFICE.

ALFRED W. STORM, OF RAMSEY, NEW JERSEY.

ELECTRIC LINOTYPE-MACHINE.

SPECIFICATION forming part of Letters Patent No. 660,263, dated October 23, 1900.

Application filed September 22, 1897. Serial No. 652,654. (No model.)

*To all whom it may concern:*

Be it known that I, ALFRED W. STORM, a citizen of the United States, residing at Ramsey, in the county of Bergen and State of New Jersey, have invented certain new and useful Improvements in Electric Linotype-Machines, fully described and represented in the following specification and the accompanying drawings, forming a part of the same.

The present invention relates to that class of machines which are adapted to compose lines of uniform length, as for newspaper and book composition, and the machine is adapted to compose a line of matrices, cast a linotype thereon, discharge the linotype to a galley, and arrange the series of linotypes in successive order therein.

The object of the present invention is chiefly to avoid the use of independently-movable matrices and to thus obviate the necessity for redistributing the same when a group of such matrices has been assembled and used, and such object is attained by forming matrices of all the characters (which are required in composition) upon the flexible arms of a spider and mounting a sufficient series of such spiders rotatably side by side to compose a line of the required length. A melting-pot and mold are arranged to move to and from the periphery of the spiders, and the mouth of the mold is flared to fit inclined sides upon the ends of the arms, so as to make a tight joint therewith during the casting operation. The desired matrices upon the spider-arms are arranged in line with the mold by a detachable connection with a rotatable bar-magnet, termed herein a "registering-magnet," which is provided with a driving-blade fitted to coincident slots in all of the spiders and is arranged within a ring-magnet, termed herein the "motor-magnet," in which "consequent poles" can be produced at any desired point to turn the registering-magnet and the spiders into the desired position. The matrices are arranged in the same order relative to their characters upon the arms of all the spiders and each spider is turned normally with the same matrix character at the top by means of a weight formed at one side of each spider, such weight also operating to bring slots in the spiders into coincidence with one another to fit the driving-blade. The driving-blade engages all of the spiders before the composition is commenced and operates to turn all the spiders together until detached successively therefrom in the progress of the composition. Each spider when suitably adjusted is locked in such position by the embrace of a slotted lock-bar, and the driving-blade is then retracted therefrom by the registering-magnet, when it and the motor-magnet are shifted laterally and assume a new position under the influence of the motor-magnet to adjust the succeeding spider. The motor-magnet is provided with a series of coils corresponding in number approximately to the number of arms upon each spider, and an electric circuit and keys are provided to vary the position of the consequent poles upon the motor-magnet as required to adjust the spiders successively. Each spider bears matrices of all the characters required for composition, and one of these characters is indicated on each of the keys, and the consequent poles produced by closing the circuit through any key operate to so turn the spiders that matrices having the character indicated on that key are brought to the casting position. The group of spiders is so mounted upon a horizontal mandrel as to be in plain view of the operator during the composing operation, thus enabling him to see the progress of the composition, and electrical appliances are provided in case an error is made in setting one of the spiders to withdraw the lock-bar from those already arranged when the spiders are all turned back to their initial position by their attached weights.

Electrical appliances are provided to signal the operator when a line is nearly composed, that he may, if required, properly divide a word at the end of a line, and a power-shaft is provided with which the operator may then connect the mold by means of a suitable clutch, so as to press the mold upon the matrices and form a casting. The spiders are provided each with a compressible justifier which is set in the composed line between the several words, and the spider-arms are made laterally flexible and their hubs are made a little thicker than the matrices upon the arms, so as to turn freely during the composition. The line is justified and brought to the standard length by means of inclined horns at the ends of the mold, which press the matrices together laterally, thus compressing the justifiers and fitting the row of characters to the length of the mold.

The mold in automatically moving from the row of matrices is brought over a chute leading to a galley and the casting is discharged from the mold into such chute. The mold is preferably integral with an oscillating melting-pot, and the final movement of the melting-pot in retracting the mold from the matrices detaches the clutch which operates the mold and brings the same to rest until another line is composed and the clutch reëngaged by the operator.

The electric keys are mounted upon a keyboard, beneath which is arranged a movable hook-board bearing a series of hooks connected electrically with the motor magnet-coils, and hooks, styled "key-hooks," are formed upon the keys and connected with the opposite terminals of a battery to engage the hooks upon the hook-board for closing each key-circuit. When such circuit is closed by depressing a key and the registering-magnet is actuated thereby, the final movement of the registering-magnet moves certain contacts in a circuit through a so-called "releasing-magnet," which initiates the movement of a spring to shift the hook-board, so as to disengage the key-hooks of the depressed key. Such key is thus released and the circuit broken and the hook-board thus restored to its initial position where it is locked in opposition to the tension of the spring by a continuously-rotating catch which engages a latch controlled by the releasing-magnet. When the registering-magnet has moved a spider-arm into the composed line, such movement of the magnet closes a circuit through a so-called "brake-magnet," which applies a brake to the registering-magnet, and thus arrests its movements positively.

Flexible connections are provided to a gas-furnace attached to the bottom of a melting-pot and a water-chamber is formed around the mold and a pump provided to circulate water therethrough after each linotype is cast. Other appliances are provided, so as to perform all the requisite operations automatically, as will be hereinafter pointed out and claimed.

The invention will be understood by reference to the annexed drawings, in which—

Figure 61:
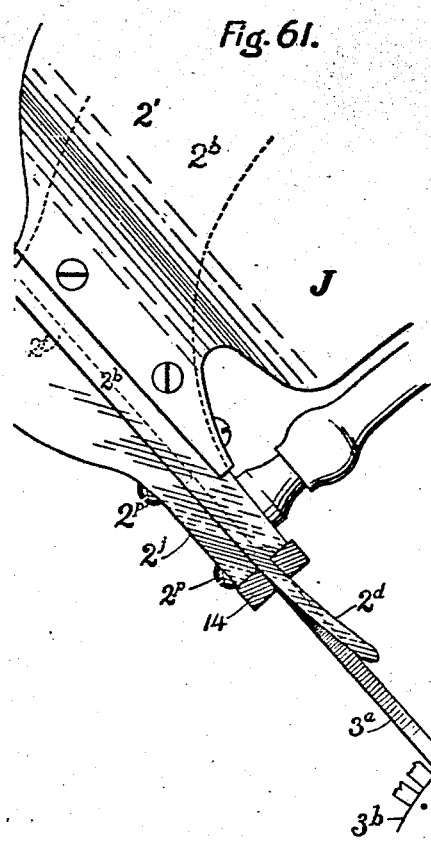
Figure 62:
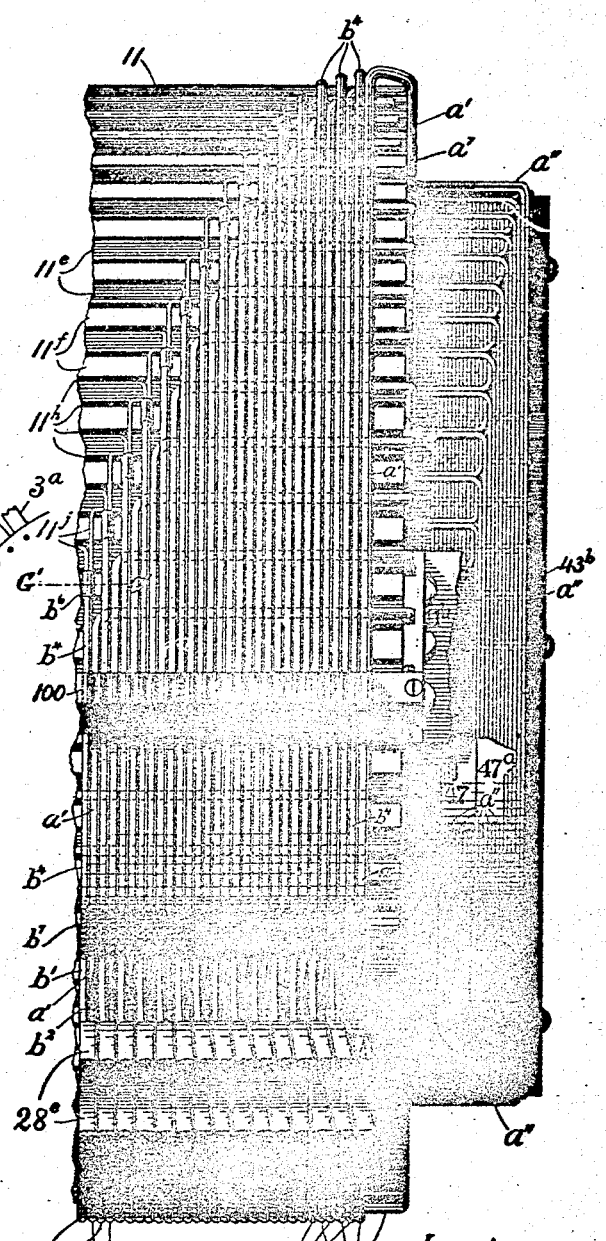
Figure 63:
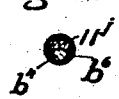

Figure 1 is a front elevation of the machine. Fig. 2 is a vertical transverse section taken on line 2 2 in Fig. 5 looking toward the left end of the machine. Fig. 3 is an elevation upon the outer side of such left end. Fig. 4 is a rear elevation, and Fig. 5 a plan, of the machine. The melting-pot 2 in both figures is shown stripped of its jacket 2'. In Fig. 5, to gain greater clearness, the melting-pot is broken away and the group of spiders omitted. The preceding figures are drawn about one-quarter the normal size, while Figs. 6 to 9, inclusive, are drawn of the normal size and are in section on line A A of Fig. 2. Fig. 6 shows the mandrel with the upper half of the pile of spiders at one side of the same and the lock-bar with one edge of the motor-magnet with which it is engaged and the horns upon the mold in readiness to justify the line. Fig. 7 shows the same parts with the horns advanced with the mold in position for casting a linotype and the line justified in the mouth of the mold. Fig. 8 is a view similar to Fig. 6, showing the spider-arms arranged with five blanks at one end of the line and the ends of the horns in readiness for justifying the line. Figs. 6, 7, 8, and 9 are diagrammatic in character. Fig. 9 shows the same parts with the mold advanced to the casting position and the line of matrices compressed within the mouth of the mold and fewer matrices in use owing to the blanks employed. Figs. 10 to 12, inclusive, are drawn three-quarters the normal size. Fig. 10 is an edge view of part of the periphery of the motor-magnet. Fig. 11 is a section of the same on line I I in Fig. 10. Fig. 12 is an inner view of the parts shown in Fig. 10 with the magnet-core, its pole-pieces, insulating-bobbins, and coils shown in section on line J J in Fig. 10. Fig. 13 is an elevation of the left end of the motor-magnet and includes one of the bridges and the guide for the lock-bar drawn one-half of actual size. In Figs. 10 and 13 the conductors $b^4$, $a'$, and $b^5$ are omitted that the construction of the magnet may be shown. Fig. 14 is a plan of the motor and registering magnets and their attachments with the mandrel for the spiders, the core for the spider-hubs, and one of the spiders upon such core, the view being in horizontal section at the center line where hatched. Figs. 14 to 20 are drawn one-half the normal size. Fig. 15 is a section of part of the motor-magnet and the lock-support, taken on line E E in Fig. 16 and looking in the direction of the arrow $e$. Fig. 16 is a section of one edge of the motor-magnet with the lock-support and a portion of the lock and spider-arms, the view being taken on line D D in Fig. 15. Fig. 17 is a transverse section of the spring 46 and roller-arm and spring contact-plate $42^b$, the view being taken on line H H in Fig. 14. Fig. 18 is a side view of the spring contact-plate $42^b$ looking toward the roller-arm. Fig. 19 is a side view of the inner side of the lock-support $11^x$ shown upon the inner side of the motor-magnet in Figs. 15 and 16. Fig. 20, drawn of the normal size, is a longitudinal section of the brake-magnet, taken on line F F in Fig. 21. Fig. 21 is an end view of the brake-magnet. Fig. 22, drawn one-quarter the normal size, is an elevation of the right end of the motor-magnet, showing the brake and registering magnets, with one of the motor-magnet bridges and a part of the commutator $43^b$ broken away to exhibit the brake and registering magnets clearly. Fig. 23 is a section of the commutator $43^b$ of the normal size, taken on line K K in Fig. 22. Fig. 24, drawn of the normal size, is a plan of the bottom end of the linotype-chute and the galley adjacent thereto, the hatched parts being in section on line O O of Fig. 25. Fig. 25, drawn one-half the normal size, is a section of the lower end of the chute and contiguous parts, taken on line L L in Fig. 24. Fig. 26, drawn one-half the normal size, is a view upon the inner side of the galley and the thrust-rod 68 with a section of the lower end of the chute, taken on line 26 26 in Fig. 25. Fig. 27, drawn one-third the normal size, is a side elevation of the mechanism for reciprocating the hook-board. Fig. 28 is a front elevation of the releasing-magnet and its adjoining bracket with bracket in section on line 28 28 in Fig. 27. Fig. 29 shows the under side of the latch-lever and tailpiece mounted upon such bracket. Figs. 30 to 37 are drawn one-half the normal size. Fig. 30 is a vertical section on line M M in Fig. 5 of the gearing for feeding the motor-magnet upon the spider-mandrel. Fig. 31 is a front elevation of the same parts. Fig. 32 is a plan of the same parts with keyboard 29 removed. Fig. 33 shows the feeding devices for the lock-bar and diagrammatically the electrical connections of the devices for returning motor-magnet to its normal position, the cylinder 15 being broken for want of room upon the drawings. Fig. 34 is an elevation of the feed-rack and adjacent portion of the motor-magnet with the dog-pin and switch for making circuit connections for the returning-magnet. Fig. 35 is an elevation, viewed from the opposite side to that shown in Figs. 1 and 33, of the feeding appliances for the lock-bar, with the cylinder 15 broken. Fig. 36 is an elevation of the same parts similar to that shown in Fig. 3. Fig. 37 is a plan of the same parts similar to that shown in Fig. 5, with the lock-releasing magnet 53 and air-check cylinder 15 broken away to show the gearing below and the poles $53^a$ $53^b$ of the lock-releasing magnet in horizontal section on line 37 37 of Fig. 36. Fig. 38 is a diagram of the electrical connections of the entire apparatus. Fig. 39 is a section of one key-head, taken on line N N in Fig. 40, which figure is a plan of one portion of the keyboard with a corner broken away to show the hooks upon the hook-board below. Fig. 41 is a vertical section on line 41 41 in Fig. 43, looking in the direction of the arrow, of portion of the hook-board with the said hooks and their electrical connections, the hooks being in rear elevation. Fig. 42 is an elevation in section where hatched of one of the keys and its hook connections with the adjacent portions of the keyboard and hook-board. Fig. 43 is a sectional elevation on line 43 43 in Fig. 5 of the front portion of the keyboard and hook-board with three of the keys and their electrical connections. Fig. 44 is a vertical central section through the correcting-key 52. Fig. 45 is a portion of the frame-pieces 1, partly shown at the left side of Fig. 3, but drawn of twice the size, showing contact, circuit-closing brushes for actuating the lock-magnet to engage the lock-bar with the lock-support when the line is composed, and contact-brushes for closing a circuit through the lock-releasing magnet when the linotype is cast. Fig. 46 is a side elevation of the bell and signal devices, the keyboard 29 and frame-piece $1^d$ being in section on line 46 46 of Fig. 48. Fig. 47, drawn one-quarter the normal size, shows the cam and elastic connection for oscillating the melting-pot and mold. Fig. 48 is a front elevation of the bell and signaling device. Fig. 49 is a vertical central section of the melting-pot nozzle and mold with a section of the locking-bar 14 and one of the spider-arms $3^a$. Fig. 50 is a cross-section of the mold on line C C in Fig. 49. Fig. 51 is a cross-section of the nozzle looking down into the mold on line B B in Fig. 49. Fig. 52 shows the end of the nozzle with mold-plate $2^j$ removed. Fig. 53 is a cross-section of the spider-mandrel, yielding core, and lock-bar, with an elevation of a spider, drawn of the normal size, with the arms at the sides broken off for want of room and the hub of the spider broken to show the construction. Fig. 54 shows the end of one of the matrices. Fig. 55 is a longitudinal section, and Fig. 56 a transverse section, of the matrix and end of spider-arm. Fig. 57 is an edge view of the compressible justifier and end of spider-arm. Fig. 58 is a diagrammatic representation, partly in section, of the electrical connections of the hook-board with the motor-magnet. Fig. 59 is a full-sized cross-section of the commutator on line P P of Fig. 60. Fig. 60 is an elevation of the right-hand side of the motor-magnet about two-thirds of the actual size, showing the details of wiring. Fig. 61 is a detailed view, three-quarters normal size, of the right-hand side of the melting-pot nozzle, showing the horn $2^d$ thereon with arm $3^a$ of a spider engaged therewith, the other arms being broken away. Fig. 62 is a fragment of the motor-magnet in front elevation, drawn two-thirds the actual size, showing details of wiring. Fig. 63 is an enlarged section on line G' G' of Fig. 62.

The frame of the machine is formed with three side pieces, (designated 1, $1^a$, and $1^b$,) a rear piece, (designated $1^c$,) a front piece, (designated $1^d$,) and a tie-rod, (designated $1^e$.) Upon the top of the side pieces is supported a melting-pot 2 by means of trunnions $2^a$, turning in suitable boxes.

The melting-pot is formed at the front with a downwardly-curved nozzle or extension $2^b$, having the mold $2^c$ upon and integral with its lower end. A mandrel 4 is fixed rigidly below the melting-pot, and a pile or group of matrix-bearing spiders, having the general designation 3, is so mounted that each may turn freely and independently upon the mandrel. As shown in Fig. 53, each spider is formed with transversely-flexible arms $3^a$, attached to a hub $3^b$ and provided with a series of balls $3^d$, bearing upon a ball-race $3^e$ to insure the spider's rotation with little friction. As shown in Fig. 6, the ball-races $3^e$ are independent of one another and fitted to the exterior of an india-rubber core $4^b$, which is fixed upon the mandrel between two collars $4^a$, which hold the group of spiders movably in a fixed position upon the mandrel.

The matrices are designated 3 in Figs. 53 to 56, and are shown with intaglio impressions, but cameo matrices may be employed if desired. Each spider is provided with sufficient arms to carry all the matrices required in composition, a spacer $3^g$, a weighted arm $3^f$, an abbreviated arm $3^x$, styled a "blank," and a justifier $3^e$. The "spacer" is a blank matrix—that is, a matrix-body not engraved with a character—designed to perform the office of a printer's "space" or "quad," and is not to be confounded with the justifier employed to "justify" the line. The weighted arm operates to bring the spider-slots s to a normal position and in alinement with each other. The blank is used only in ending a line, in a manner to be explained. The justifier is compressible, and is shown in edge view in Fig. 57 broken from one of the arms $3^a$. The justifier comprises two flexible strips attached at their ends and separated intermediate thereto and formed intermediate to the ends with parallel edges adapted to enter and fit the mold. In practice one of such strips is formed by suitably bending the arm $3^a$ in the direction of its thickness and riveting thereto the ends of a similar bent plate $3^e$. The same characters appear normally in rows across the face of the group and the weight $3^f$ upon each spider holds them normally in such position.

The slot in each spider is shown at s in Fig. 53 to receive the driving-blade 13. A shaft 35 is mounted upon the frame-pieces 1 and $1^b$ and provided with fast and loose pulleys 36 $36^a$ to receive belt 37 and with a cogged gear 60, which when the machine is in operation continuously rotates, transmitting its motion to a cog-wheel 56. The wheel 56 turns loosely upon the shaft 6 and is provided with a clutch-hub 7. (Shown only in Fig. 4, where the rear of the frame 1 is broken away for that purpose.) A shifting-clutch 58 is fitted to the shaft 6, so as to turn the same, and is pressed normally toward the clutch-hub 7 upon the gear-wheel 56 by a spring 59. A bell-crank $59^a$ is pivoted upon the frame 1 and has one arm fitted to a groove in the clutch 58 and the other arm extended beneath a hinged dog $2^e$ upon the rear end of the melting-pot. A spring-rod, with latch $51^a$, (see Fig. 3,) is mounted upon the side of the frame-piece 1, and the latch is adapted to hold the bell-crank arm away from the frame in the position shown in Fig. 4 to hold the spring 59 normally compressed and the clutch 58 normally disengaged from the gear 56. A handle 51, Figs. 1, 3, 4, and 5, is projected from the forward end of the spring-rod, and when the operator has composed a line of matrices it is pulled to withdraw the latch from the bell-crank, which permits the clutch 58 to engage the clutch-hub 7 on gear-wheel 56, as indicated by dotted lines in Fig. 4, and rotate the shaft 6. The shaft 6 then operates to effect a variety of mechanical movements and to make various contacts required to operate the electric circuits, and its motion is automatically stopped by the melting-pot disengaging the clutch 58 through the agency of the bell-crank when a linotype has been cast and delivered into the chute 8. The casting movements also operate to thrust the previously-cast linotype $2^{e'}$ into the galley 9 through the agency of a cam 67, fixed upon shaft 6.

After completing a linotype most of the parts that have effected the result are not in their normal positions. This is particularly true of the motor-magnet, the registering-magnet, the spiders, the lock-bar, and the mold. In order to restore these parts to their normal positions and prepare for casting another linotype, I so form the cam $7^a$ that its revolution, initiated prior to casting, will permit the pressure upon arm 62 to diminish until gravity has caused the melting-pot to assume its normal position, removing, as it does, the mold from the matrices and causing the ejection of the completed linotype. The shaft 6 makes one entire revolution at each casting, and these movements occur during a final fraction of that revolution equal to about one-quarter. At the melting-pot settles back into its normal position further revolution of the shaft 6 is checked through the agency of the bell-crank 59, as has been described. Simultaneously with the completion of a revolution of shaft 6 the gear 56, turning therewith, completes a revolution, and the contact 70, integral with the wheel, is caused to pass under and in contact with the brushes 71. (Shown in Figs. 3, 38, and 45.) This closes a circuit through the brushes 71, the battery A, proper connecting-wires, as c, c', and $c^2$, and lock-releasing magnet 53, as clearly shown in diagram Fig. 38. On this occuring the lock-releasing magnet is energized to attract the pawls 22 $22^a$, which free the lock-bar 14, allowing its return through the agency of the spring $15^b$. (See Figs. 1, 33, 35, and 36.) The return of the lock-bar to its normal position frees the spiders, when they instantly assume their normal positions in the manner previously described. The air-check piston $15^a$, to which is attached the lock-bar by means of rod $14^a$, thrusts itself between the contact-springs $d'$ $d''$ as the lock-bar reaches its normal position, closing a circuit through the switch 72. Said switch has been closed prior to these movements by the dog-pin $11^e$ on motor-magnet when motor-magnet was shifted clear of the group of spiders before the casting operation began. As the circuit closes a current from battery B flows through the spring-contacts $d'$ $d''$, the piston $15^a$, and appropriate circuit connections, as $d^2$, $d^3$, $d^4$, and $d^5$, to and through the returning-magnet 54. (See Fig. 38, &c.) On this occurring said magnet is energized and lifts the pawls 27 and 40, freeing the pinion 98. The spring 39 then instantly returns the motor-magnet to its normal position. In so returning it carries with it the registering-magnet, with its attached blade, and thrusts same into the spider-slots. As the hook-board was returned to its normal position immediately after setting the last spider, all parts are now in readiness to compose a new line.

As will be seen by reference to Figs. 1, 2, and 5, a receiver is fixed below the mold and formed with reversely-inclined planes $8^a$ $8^b$, connected at the bottom by a curve suited when the linotype falls upon the nearer plane to reverse the casting, so that the under edge (bearing the type characters) is turned upward. The connecting-curve is inclined laterally and merges into a plane $8^c$, leading to the chute 8, so that the casting after sliding down the first plane and up on the second plane (where it is reversed) slides endwise into the chute and then downward within the same to a point over the galley 9.

To prevent the rebound of the linotype and to retain it in the desired position, I provide the spring-catch $8^d$ on rear wall of chute.

The construction of the galley is plainly shown in Figs. 3, 5, 24, and 26. It consists of a flat bar 9, provided with a head $9^a$ and a head-plate $9^b$ and movably fitted to brackets $9^c$, mounted on frame-piece $1^b$. To the under side of the bar 9 is attached a ribbon $9^e$, preferably of metal, arranged to pass over roller $9^d$ and under roller $9^{d'}$ in weight $9^f$, after which it is joined to roller-bracket $1^g$, as shown in Fig. 3. The weight $9^f$ operates to force the galley rearwardly, and thus serves to hold the linotypes compactly in order in a manner to be explained.

Figs 24, 25, and 26 show the construction of the linotype-storing devices, a thrust-rod being provided to push the linotype-castings into the galley as they are produced. The reciprocating thrust-rod 68 is held normally away from linotype by spring $68^a$ and is actuated by cam 67 at each revolution of shaft 6 to force a linotype through the spring-catches 69 into the galley against the resistance of the weight $9^f$ in proper order relative to the operator's "copy." The spring-catches operate to prevent the weight $9^f$ forcing the linotype into the chute when rod 68 is retracted.

The melting-pot is formed with a jacket $2'$, having non-conductive lining to retain the heat, and with a chamber or furnace J, containing gas-jets $j$ to melt the type-metal.

The melting-pot is provided with a crank-arm $62^a$, and the shaft 6 with a cam $7^a$, suitably connected to such crank-arm to oscillate the melting-pot and press the mold firmly but elastically against the row of matrices when adjusted. The elastic pressure is produced by a rod 61, which is connected with the crank-arm $62^a$ by a spiral spring $61^b$ and with the cam $7^a$ by a roll $61^a$, and the cam is so shaped that after moving the mold into contact with the matrices it holds it stationary while the casting is made upon the matrices and then permits the melting-pot to resume its normal position through gravity, thus raising the mold upward, moving the hinged dog $2^i$ into contact with the bell-crank 59, and throwing the clutch 58 out of engagement with the gear 56. The mold then remains stationary until the operator composes another line of matrices and pulls the handle 51 to inaugurate the same movements of the mold.

The mold is constructed and operated as follows: The front of the nozzle $2^b$ upon the melting-pot is curved downward and upon its lower part is formed the mold, the front side of which is for convenience closed by a removable plate $2^j$, styled the "mold-plate," which closes the nozzle and completes the mold $2^c$. This plate is fixedly attached by means of screws $2^p$, as shown in Figs. 1, 49, 51, and 61. The mold is shown in Figs. 49 to 52, inclusive, with a water-chamber $2^m$ surrounding the same and provided with porcelain or other non-heat-conducting tubes $65^h$ for the inlet and outlet of water. The mouth of the mold is made with flaring lips $2^{e'}$, fitted accurately to beveled faces at the opposite sides of the matrices, one of which is shown in section in Fig. 49 supported against the mouth of the mold by a so-called "lock-bar" 14. A gate $2^f$, which operates to admit the fluid metal to the mold, is shown fitted to slide up and down in a channel formed in the flat face of the nozzle and is extended at the top, as shown in Figs. 1 and 2, outside of the nozzle, where it is provided with a rack $2^{g'}$. The lower end of the gate is adapted to shape the base of the linotype. It is shown in the drawings as having a straight edge, but may be given a special form, if desired. A shaft $2^h$ is mounted upon bearings on the upper end of the mold-plate $2^j$ and provided with a segmental gear $2^c$, fitted to the rack, and with an arm $2^i$, having a rod 63 pivoted thereto and reciprocated by a pin $6^a$ upon the shaft 6. The lower end of the rod 63 (see Figs. 1, 2, 4, and 5) is provided with a weight $63^a$, which is forked to straddle the shaft 6, upon which it normally rests and holds the rod. A roll $63^b$ is fixed within the weight, and the pin $6^a$ is projected from the shaft to press against the roll and lift the weight at a suitable time as the shaft revolves. Owing to the stationary position of the rod 63 during the movement of the mold to and from the matrices the arm $2^i$ is oscillated and the gate $2^f$ is moved up and down within the mold without opening the same; but the pin $6^a$ produces an additional upward movement of the gate when the mold is pressed upon the line of matrices to admit the fluid metal to the mold. The parts are so adjusted that when the gate descends to shut off the fluid metal it will slightly compress the metal remaining in the mold, and thus assist to obtain a sharp cast of the matrices. The oscillation of the arm $2^l$ by the movement of the mold is indicated by the depression of the arm and gate in Fig. 3, in which latter figure the melting-pot is shown in both full and dotted lines, the former representing it with the mold depressed to the spiders and the dotted lines representing it with the mold elevated, as in Fig. 2. In such latter position the mold is moved vertically over the chute 8, and the depression of the gate within the mold causes it to operate as an ejector and discharge the linotype $2^{c'}$ into the chute 8, as shown in dotted lines in Fig. 2, whence it is thrust into the galley by thrust-rod 68 during the succeeding casting movement. The cam $7^a$ retains the mold in the casting position until the metal congeals, and to insure the rapid hardening of the metal water is circulated around the mold by a pump 65, actuated by an eccentric 66 upon the shaft 6. The pump is arranged within a tank 64, which holds the water and delivers the water from the pipe $65^a$, having a check-valve $65^f$, through the flexible tube $65^b$, into the water-chamber $2^m$, whence it is discharged to the tank by the flexible tube $65^c$ and siphon-pipe $65^d$. The pump commences its downward stroke as the gate or ejector $2^f$ moves downwardly after admitting the molten metal to the mold. The top of the pipe $65^a$ is provided with an inwardly-opening air-valve $65^e$, and while the water is propelled by the pump such valve remains closed; but when the action of the pump ceases the weight of the water in the vertical pipe $65^d$ opens the valve $65^e$ and the contents of the water-chamber are siphoned out to the tank. Linings $2^k$, of fire-brick or other non-heat conductor, are fitted to the inner walls of the nozzle $2^b$ just above the mold to protect the water-chamber from the heat of the metal in the melting-pot, and thus facilitate the cooling action of the water upon the casting. One of these non-conducting linings is formed with notches 2', expanded upwardly, through which the surplus metal may be forced back to the melting-pot as the gate descends. The elevated position of the gate, which is produced by the operation of the pin $6^a$ upon the rod 61, is shown in Figs. 9, 49, and 52, where the top of the mold is opened to admit the fluid metal. Fig. 7 shows the mold with the water-chamber around it and represents the gate lowered to form the base of the linotype-casting, thus covering the notches 2', as shown in such figure. These notches are further shown in Figs. 49, 51, and 52. In Figs. 49 and 52 the gate $2^f$ is shown lifted to permit the influx of the molten type-metal. In Fig. 7 it is shown lowered to a point where it will cut off connection between the mold and the melting-pot and where it will form, also, the base of the completed linotype. In approaching this point the molten metal lying between its lower edge, when uplifted, as in Figs. 49 and 52, and its second position, as shown in Fig. 7, is forced by it through the said notches 2' into the melting-pot, and its stroke is so adjusted that it will slightly compress the contents of the mold after passing the lowermost part of the notches, thus insuring a sharp casting, as stated. The notches therefore permit the ready escape of surplus metal in casting through the non-conductive plate $2^k$. The mold is shown in Fig. 7 in connection with the downwardly-projecting horns $2^d$, which are inclined inwardly and are employed to press the matrices into lateral contact before making the casting, such horns being shown, in Figs. 2 and 61, curved concentric with the trunnions $2^a$ of the melting-pot, so as to pass through the slot in the lock-bar 14, as represented in Fig. 61.

Fig. 38 is a diagram of the electrical connections and circuits involved in the operation of the machine, the diagram showing the coils of the several magnets employed, with a perspective view of part of the mandrel 4, with the hub 45, brake-magnet 44, and arms carrying the roller-contacts to coöperate with the commutator $43^b$. The diagram also shows the correcting-key 52 for removing the lock from the spiders to redistribute the same when an error has been made in composition, the automatic switch 72 for returning the motor-magnet to its normal position, and part of the gear-wheel 56, carrying contact-plates, adapted to connect brushes which close certain of the circuits automatically when the wheel is set in rotation by the operator. In this diagram the different circuits are designated by arrows of different form, as shown in the index at the top of the sheet. In the diagram, A designates a battery employed to energize the motor-magnet 11, the lock-magnet 20 to engage lock-bar with lock-support, and the lock-releasing magnet 53 to retract the lock-bar from the spiders for distributing the same. The diagram also shows a second battery B, provided to energize the brake-magnet 44, the releasing-magnet 32, which operates to shift hook-board and motor-magnet, the returning-magnet 54, which frees the motor-magnet from its feeding mechanism and permits the spring upon the mandrel to return the motor-magnet to its normal position, and the lock-magnet 20 for moving the lock-bar step by step over the spiders when adjusted. The descriptions of the circuits through the several batteries and magnets are given in their appropriate places. The construction of the keys, which enables them to direct these circuits through the motor-magnet coils and to the other magnets, is shown in Figs. 39 to 43, inclusive, as well as in Figs. 1, 2, and 5, the key-heads being omitted from Fig. 1 to avoid obscuring the switch actuated by the motor-magnet.

Referring now to the electrical devices for assembling the desired matrices in line preparatory to casting, 11 designates the annular motor-magnet, with bridges $11^a$ and $11^b$ at opposite ends to support it upon the mandrel 4, where it is movable longitudinally over the group of spiders, one of which is shown in full lines in Fig. 14, while the outline of the entire group is indicated by dotted lines 3 upon the core $4^b$. The motor-magnet and its bridges are held from rotation upon the mandrel 4 by a feed-rack 100, (shown in Figs. 1, 5, 13, 14, 30, 32, 33, and 62,) which rests upon the top of the front frame-piece $1^d$ and is held movably in place by a guide-bar 99. A hub 45, chiefly of insulating material, is fitted to turn upon the mandrel 4, with balls $t$ forming a bearing within one end, the opposite end being swiveled to a collar integral with the bridge $11^b$ by means of a screw $u$, fitted to a groove in such collar. The motor-magnet is formed, as shown in Figs. 10 to 15, inclusive, with an annular core $11^d$ and a series of coils of insulated wire $11^e$, corresponding to the various arms upon the spiders. The coils $11^e$ are wound upon insulating-bobbins $11^h$ and alternated upon the core with pole-pieces $11^f$. All the pole-pieces are provided with projections at one end turned inward, as shown in Fig. 14, to concentrate the magnetism upon the registering-magnet. The core is made in two parts with a tongue-joint united through the agency of a pole-piece by screws $11^i$, as shown in Figs. 12 and 14. The registering-magnet consists of a permanent bar-magnet 10, which is swiveled upon one end of the hub between collars upon the same and carries a laterally-projecting blade 13, adapted to fit the slots in the spiders and rotate the same.

The motor-magnet 11 is provided with means for feeding it longitudinally upon the mandrel, and the connection of the registering-magnet with the hub 45 carries it with the motor-magnet, and thus either withdraws the driving-blade 13 from or pushes it into the spider-slots. The registering-magnet has a limited movement upon the hub 45; but when influenced by the magnetic field of the motor-magnet it can rotate to any position about the mandrel 4, and thus turn the group of spiders to any desired position when the driving-blade is engaged therewith. The registering-magnet's movement upon the hub 45 is limited by the projection of the leaf-spring 46 from the hub and the provision of two non-conductive pins $10^a$, adapted to embrace the outer end of the leaf-spring. (See Fig. 22.)

In the normal adjustment of the parts for composition the motor-magnet is carried to the left of Figs. 1 and 14 by spring 39 upon mandrel 4, (see Fig. 5,) thus wholly inclosing the group of spiders and engaging the driving-blade 13 upon the bar-magnet 10 with all of the spiders, so as to turn them simultaneously. A magnetic field within the motor-magnet is then created by means of one of the finger-keys 5 and suitable electric connections with the coils $11^e$, which influences the registering-magnet and effects a rotation of the group of spiders. The spider at the left end of the group thus turned with the desired matrix in casting position is then locked, and the motor-magnet, carrying with it the registering-magnet and the driving-blade, is immediately afterward moved to the right one step, so as to disengage the driving-blade from the adjusted spider. The poles of the magnetic field are then shifted by the keys to readjust the group and set the succeeding spider with a desired matrix in casting position, which in turn is locked, and so on step by step through the group, the matrices being thus "assembled" to form the desired characters on the linotype. The motor-magnet is energized by the battery A, the current from which is controlled by the keys 5 and directed by them through proper connections to diametrically-opposed coils, as shown diagrammatically in Figs. 13 and 38. Said connections are shown in detail in Figs. 41, 42, 43, 60, 62, and 63. In Fig. 43 it will be seen that the plates $29^a$ $29^b$ of keyboard are each connected with a pole of the battery A. As explained elsewhere, each key is furnished with secondary strips $5^b$. These strips are in connection with plates $29^a$ $29^b$ and when the key is depressed into engagement with hooks $28^d$ complete a circuit through conductors $b^4$ $b^2$ of connectors $28^e$ and the motor-magnet. Each connector is made up of three wires, as shown by cross-section in Fig. 41. In Figs. 1 and 58 these connectors are shown running from hook-board to motor-magnet.

In a rapidly-working machine dependent upon the revolution of a group of spiders, as described, it can be readily seen that the momentum of such spiders would tend to interfere with the locking of the desired matrix in the proper place when adjusted and would thus produce upon the linotype when cast a character different from that intended. I therefore provide a brake-magnet 44 for instantaneously checking the movement of the registering-magnet when brought to its desired position. The brake-magnet is an electromagnet mounted longitudinally movable on a brass arm $44^a$, projected from the hub 45, opposite the leaf-spring 46, and is operated in conjunction with an iron brake-ring $47^a$, mounted upon the pole-pieces of the motor-magnet, but held sufficiently distant from said pole-pieces to be inappreciably affected by their magnetic induction by means of the brass ring 47. As will be seen in Figs. 1, 5, 14, 22, 60, and 62, an annular commutator $43^b$, of insulating material, having two concentric sets of contact-bars, is attached to the brass ring 47. The brake-magnet, as shown in Fig. 20, is formed with an iron core $44^b$, wound with insulated wire $44^c$, and is held normally free from the brake-ring by a spring $44^d$, contained in a casing $44^e$, which is screwed upon a longitudinal extension $44^f$ of the core $44^b$. A collar $44^g$ is fastened by pin $44^h$ to the arm $44^a$ and receives the thrust of the arm-spring $44^d$. The weight of the magnet tends to turn it normally beneath the mandrel 4 and by means of the spring 46 and pins 10ᵃ to hold the registering-magnet normally in a vertical position. A roll 41 or other suitable contact-piece is mounted upon an arm 42, which is attached to the hub 45, fixedly in alinement with arm 44ˢ, and adapted to close, through a commutator-bar 43, an electric circuit through the brake-magnet when said magnet is in line with bar. Constant connection between brake-magnet and one pole of the battery B in said circuit is maintained by means of the collar 48ᵃ and brush 48. As is shown in Figs. 14 and 38, one extremity $a^3$ of the brake-magnet's coil is joined to the collar 48ᵃ and the other to the arm 42, and it is therefore obvious that the brake-magnet may be energized at any point relative to its normal position at which said commutator-bar may lie. (See Fig. 22.) The brake-magnet is energized by battery B, the circuit of which is closed through the agency of the roll 41 and a commutator-bar 43, as stated; but the particular bar employed is dependent upon the operator and controlled by one of the keys 5 in electrical connection with it. (See Fig. 38.) As will be seen in Fig. 43, one pole of battery B is joined to the plate 29ᶜ of keyboard 29 by wire $a^5$, and the primary strips 5ᵃ of the keys 5 are in electrical connection with said plate. The hook 28ᵉ, with which the free end of the primary strip (called for convenience a "key-hook" and marked 5ᶜ) engages, is in electrical connection with one of the wires $a'$ of the connector 28ᵉ, as shown in Figs. 41 and 43. This connector runs from hooks 28ᶜ and 28ᵈ to the motor-magnet 11, where its strands are properly divided, the wire $a'$ conveying current for the brake-magnet being connected to one of the bars 43 of the commutator 43ᵇ by a branch $a''$, as shown in Figs. 38, 59, 60, and 62. Thence through rolling contact 41 and arm 42 the current passes through coil of brake-magnet, thence from the coil-terminal $a^3$ to the collar 48ᵃ, thence through brush 48 and a proper conductor $a^2$ to lock-magnet 20, thence through wires $a^3$ to releasing-magnet 32, and finally through wire $a^4$ to other pole of battery B. (See Fig. 38.) It is obvious, therefore, that though all keys are connected through their primary strips with battery B but one commutator-bar at a time is in circuit with said battery, as its connection therewith is dependent upon the engagement of a key-hook with a hook in electrical connection with said bar, and it is further obvious that any bar can be put in circuit by depressing the proper key. By these means the brake-magnet can be actuated at any point in its orbit coincident with a bar, and the connections are so arranged that as the roll 41 reaches the bar in circuit with the depressed key the registering-magnet, which has actuated the roll, will have brought to the casting position a matrix capable of forming upon the linotype a character indicated on the key. The brake-magnet remains operative until the registering-magnet and the attached spiders are properly adjusted and the spring 46 in assuming its normal shape has closed a circuit through the roll 41ᵃ and the commutator-bar in connection with the key that has effected this adjustment. Any oscillations of the registering-magnet and attached group of spiders due to momentum therefore prevent the coincidence of the contact-plate 42ᵇ and the spring 46 with commutator-bar and the operation of the locking devices until the desired matrix has exactly registered. The spider carrying the matrix thus adjusted is locked by means of a forked bar 14, (see Figs. 1, 2, 5, 6, 14, and 53,) which is sustained by a bearing 14ᵈ upon the magnet-bridge 11ᵃ and moved forward step by step by the rod 14ᵃ of a piston 15ᵃ, fitted to an air-check cylinder 15. (See Figs. 5 and 33.) The lock-bar, as shown in Figs. 53 and 61, embraces the spider-arm 3ᵃ just beneath the matrix 3' and is moved forward the thickness of each spider-hub about one-tenth of an inch by the mechanism shown in Figs. 33 to 37, inclusive. A spring 15ᵇ upon the piston-rod 14ᵃ serves to retract the lock-bar normally from the spiders, and a rack is formed in one side of the piston to which a cog-wheel 16 is fitted. The cog-wheel turns with a shaft 17, which is journaled upon bearings 19 and 23, the bearing 19 being attached to the pole-piece 20ᵃ of the so-called "lock-magnet" 20. The bearing 19 is of brass and so thick between the shaft and pole-piece as to cause the bulk of the magnetic flux of lock-magnet to pass through armature 21. Ratchet-wheels 18 and 18ᵃ are also fitted to shaft 17, and an armature 21, formed of iron, is loosely mounted upon the shaft to coöperate with the magnet 20 and provided with a counterweight extension 21ᵇ to hold it normally away from the magnet-pole. The pole is bent at right angles in a horizontal plane, so as to come under the armature, as shown in Fig. 37. The armature 21 is vertically extended to form a bell-crank 21ᵃ, carrying a pawl 22, and a stop-pin 21ᶜ is provided to limit the movement of the pawl under the influence of the counterweight 21ᵇ. The magnet 20 is energized when each spider is adjusted to lock the adjusted spider-arm immediately in position by a current shunted through its circuit-wires $a^2$ $a^3$ $a^4$ by circuit-closing devices inoperative until the registering-magnet is at rest. An elastic plate 42ᵇ, Fig. 14, is projected from the arm 42ᵃ and adapted to contact with the edge of the spring 46 when the arm and the spring are in line with one another. As shown in Fig. 38, the circuit through the lock-magnet 20 includes a brush 48, a collar 48ᵃ upon the hub 45, the arm 42ᵃ, the spring 46, which is connected with such collar by conductor $a$, and the said plate 42ᵇ, which places the spring in electrical connection with the arm 42ᵃ and the contact-roll 41ᵃ. The rotations of the hub 45 are controlled entirely by the registering-magnet 10 through its engagement with the spring 46; but the magnet is capable, as indicated by the dotted lines 104 in Fig. 22, of turning upon the hub so as to bend the spring 46 when the brake-magnet is energized, and the registering-magnet is carried beyond its normal position relative to the spring by its own inertia and that of the spiders.

Referring to Figs. 17 and 22, it will be seen that when spring 46 has been bent out of alinement with arm 42$^a$ the electrical connection between the spring and plate 42$^b$ is broken and no current can pass to the lock-magnet save through the circuit of the brake-magnet. In order to prevent the energizing of the brake-magnet from prematurely actuating the locking devices, I wind the brake-magnet with fine wire and the lock and releasing magnets with coarse wire, thus raising the resistance of the brake-magnet and preventing sufficient current passing the lock and releasing magnets to energize them. The locking devices therefore remain inoperative until the registering-magnet has returned to its normal position relative to the arm 42$^a$, when a circuit is closed through the plate 42$^b$ and spring 46, through which, owing to the greater resistance of the brake-magnet, most of the current from battery B is shunted to the lock and releasing magnets, serving to energize them and actuate the locking devices. To effect the results desired, the commutator-bars are arranged radial of two circles, one of which is concentric with the other. With the bars 43 of the outer circle the roll 41 makes contact and with the bars 43$^a$ of the inner circle the roll 41$^a$ makes contact. The circuit of the lock-magnet is identical with that of the brake-magnet, excepting that part lying between the junction of the branch conductors a'' of bars 43$^a$ with the main conductor a' and the collar 48$^a$—namely, the branch a'', the bar 43$^a$, the roll 41$^a$, the arm 42$^a$, the plate 42$^b$, the spring 46, and the conductor a.

The key which closes a given circuit through the motor-magnet coils to set the registering-magnet partly closes also a circuit through that commutator-bar which lies in line with the position the registering-magnet will assume, and the lock-magnet cannot, therefore, be energized until the registering-magnet has assumed the desired position and the resilience of the spring 46 has turned the hub 45, with the roll 41$^a$, in contact with the appropriate commutator-bar and completely closed a circuit through itself, the spring-plate 42$^b$, the depressed key-battery B, and the lock-magnet 20. Oscillations due to momentum of the spiders delay these operations until the matrix is exactly adjusted. When thus energized the magnet 20 attracts the armature 21 and oscillates the pawl 22, the ratchet 18, and wheel 16, thus moving the piston 15$^a$ forward in opposition to the spring 15$^b$, advancing the lock-bar sufficiently to embrace the arm of the adjusted spider. A pawl 22$^a$, shown in Fig. 35 attached to the bracket 23, operates with the ratchet-wheel 18$^a$ to hold the piston and lock-bar when advanced. The feeding of the lock-bar forward automatically is thus effected step by step upon each adjustment of a spider. Should the operator adjust a spider wrongly, it is necessary to distribute the composed characters by releasing the spiders from the lock-bar, and for such purpose I provide a correcting-key 52, adapted to close a circuit through an electromagnet 53 for retracting the pawls 22 22$^a$, and thus permitting the spring 15$^b$ to retract the lock-bar. This lock-releasing magnet 53 is fixed at one side of the cylinder 15, and its pole-pieces 53$^a$ 53$^b$ are adapted to embrace the cylinder and extend by the sides of the pawls 22 22$^a$.

When it is desired to withdraw the lock-bar from the spiders, the magnet 53, which is termed the "lock-releasing" magnet, is energized to lift the pawls from the ratchet-wheels 18 18$^a$, thus permitting the spring 15$^b$ to retract the piston in cylinder 15. A flat valve 15$^d$ in the bottom of the cylinder confines the air when the piston thus returns, and holes 15$^c$ in the cylinder 15 permit the air to escape gradually, and thus prevent any shock from the sudden movement of the parts.

The circuit of the lock-releasing magnet 53 when actuated by the correcting-key 52 is shown diagrammatically in Fig. 38. As will be seen, one pole of battery B is in connection with the fixed extremity of the correcting-key through wires $a^5$ and $a^6$. From the contact-point of the key a wire $c^3$ is led to the wire c', also in the circuit of the lock-releasing magnet. From the lock-releasing magnet the current is directed through wires $c^2$ and $a^3$, thence to the releasing-magnet 32, and thence through wire $a^4$ to the other pole of battery B. It is not essential that its circuit include the releasing-magnet. It is so shown in the diagram as a convenience. The key shown is a contact-key; but it is obvious that a switch could be employed instead.

Means are also provided to withdraw the lock-bar automatically after each linotype is cast upon the composed matrices, which will be described later. The key-hooks 5$^c$ and 5$^d$ maintain the circuits formed through such hooks until the spider is locked. In the circuit of the lock-magnet is a so-called "releasing-magnet" 32, which is simultaneously energized therewith and operates to shift the hook-board to disengage such hooks. To insure a proper locking of the spider, the hooks are so formed as to maintain a closed circuit during a portion of the shifting movement. The hook-board is mounted free to reciprocate horizontally in ways 30 30$^a$ in frames 1 and 1$^a$ and provided with a bracket-arm 31, carrying inside the frame 1$^d$ a magnet 32 and upon a bearing 31$^a$ below such magnet a latch-lever 33 in a position to act as an armature to such magnet. (See Fig. 27.) The latch-lever is provided with a tooth 33$^c$, adapted to engage a catch 34ª, integral with the hub 34, attached to and rotated continuously by a hub attached to the pulley-shaft 35. A spring 38 is shown in Fig. 27 attached to the frame 1ᵈ and bearing upon a pin 31ᵇ on the bracket 31ⁱ to press the hook-board normally outward to detach the hocks 28ᶜ 28ᵈ from the key-hooks, as indicated by dotted lines in Figs. 27 and 43. The weight of the latch-lever presses the lever normally upon the hub, so that the catch 34ª may engage the tooth 33ᵉ, which operates to draw the hook-board inwardly where the hooks may engage the key-hooks. The latch-lever is provided at its rear with a jointed tailpiece 33ª, which when the hook-board is drawn inward normally engages a stop 1ᶠ upon the frame 1ᵈ, being held normally in a line with the latch-lever by a spring 33ᵇ. (See Figs. 27, 28, and 29.) The hook-board is thus secured and retained normally in position for the hooks to engage until a current is shunted from the commutator-bar (in contact with the roll 41) through the conductor a³ or, in other words, through the circuit of the lock-magnet 20 into the releasing-magnet 32. An armature projection 33ᵈ upon the latch-lever is then attracted by the magnet 32, and a lug 33ᵉ, carried by the lever, pushes the tailpiece clear from the stop 1ᶠ and permits the spring 38 to move the hook-board forwardly with all the hooks thereon. Such movement disengages the three hooks which were connected with the key through which these operations have been effected, thus breaking all the circuits and resetting the entire apparatus in readiness to adjust the succeeding spider. The key is carried back to its normal position by the elastic strip which supports it upon the keyboard, and the lever 33, released from the magnet 32, is caused by gravity to assume its normal position, where the revolving catch 34ª immediately engages with the tooth 33ᵉ upon the lever and draws the hook-board inwardly, where it is retained by the tailpiece 33ª. As the circuit of the releasing-magnet 32 is included in that of the lock-magnet 20, it is simultaneously energized therewith and by means of the same circuit-closing devices and current as described pertaining to the lock-magnet.

The return of the hook-board is utilized to actuate the feeding devices for shifting the motor-magnet and registering-magnet 10 step by step, so as to retract the driving-blade 13 successively from each spider as it is adjusted. Such feeding mechanism consists of a rack 100, attached to the side of the motor-magnet, (see Figs. 5, 14, 30, 32, 34, and 62,) and is actuated by a pinion 98, ratchet-wheel 26, and a pawl 27, attached to the reciprocating hook-board, as shown in Figs. 30, 31, 32, and 34. As will be seen in Figs. 30, 31, and 32, the pawl 27 is attached to the hook-board through the medium of a spring-bar 27ª, the pivot of the pawl being a stud fixed in said spring-bar and said spring-bar being loosely attached to hook-board by the stud 27ᵇ. The object of this construction is to avoid shock to and possible mutilation of the pinion 98 and rack 100 before the sudden movement of the hook-board can overcome the inertia of the motor-magnet. Fig. 30 is a vertical section through the pinion and its spindle 98ª, showing the ratchet-wheel 26, made integral with a similar wheel 26ª and attached to the spindle by a set-screw. A pawl 40 is shown pivoted upon the under side of the keyboard 29 to engage the ratchet-wheel 26ª to retain the pinion when it is rotated by the ratchet-wheel 26. A so-called "returning-magnet" 54 is shown in Fig. 31 attached to the under side of the keyboard, with its pole-piece in proximity to projections 54ª upon the pawls 27 and 40, so as to retract them from their ratchet-wheels when the magnet is energized. A curved line 11 in Fig. 30 indicates the periphery of the motor-magnet with the rack 100 attached thereto and resting upon the frame-piece 1ᵈ and held from lifting (to hold the motor-magnet from rotation) by a guard-strip 99. (Shown in Figs. 1, 5, 30, 32, and 34.) Fig. 32 shows the parts contiguous to the rack in plan with the keyboard removed, thus exposing the pawl 27 attached to the hook-board. The pawl 40 is removed with the keyboard; but the ratchet 26ª conceals the ratchet 26 beneath it, which coöperates with the pawl 27. The returning-magnet 54 is shown in its normal relation to the pawl 27. Fig. 32 also shows a portion of the motor-magnet 11 with the rack attached to its front side and a switch 72, attached by a dog-pin 11ᶜ, fixed in and movable with the magnet for so shifting the switch as to close a circuit through the returning-magnet. Such switch is clearly shown in Figs. 1, 34, and 38, comprising a non-conducting block 72ᵈ, mounted upon the guide-bar 99 parallel with the movement of the motor-magnet and having two pins 72ᵇ and 72ᶜ inserted through the same in electrical connection with the circuit-wires d² d³ d⁴ d⁵ and the returning-magnet. The switch-bar 72' is pivoted upon the pin 72ᵇ and is provided with sloping ends 72ª and 72ᵉ, adapted to contact alternately with the stud 11ᶜ as the motor-magnet reaches the extremes of its movement in either direction. When one arm of the switch-bar 72' is depressed, it contacts with the pin 72ᶜ and closes the circuit through both the pins, the wires d² d³ d⁴ d⁵, and the returning-magnet 54, and the dog-pin 11ᶜ so shifts the switch only when the devices for shifting the registering-magnet have caused it to withdraw the driving-blade 13 entirely from the group of spiders, or, in other words, when a line is wholly composed. The retraction of the pawls 27 and 40 from their ratchet-wheels by the returning-magnet 54 permits the spring 39 upon the mandrel 4 to shift the motor-magnet, registering-magnet, and driving-blade in the direction of the group of spiders to lock the spiders in their normal position prior to recomposition; but as such operation of the driving-blade cannot be performed until the spiders are released from the lock-bar and have assumed their normal positions under the influence of the weight 3' upon each spider I prevent the returning-magnet from operating until these movements have been effected by joining the circuit-wires $d^3$ $d^5$, as shown in Fig. 33, to spring-contacts $d'$ $d''$, attached to the air-check cylinder 15, of vulcanite or similar non-conductor, and connected electrically only when the piston $15^a$ is in its normal position and the attached lock-bar wholly retracted. The air-valve $15^d$ and small vents $15^e$ cause such piston to retract the lock-bar slowly, thus permitting each spider as it is released to assume its normal position, with the slot $s$ in line with the normal position of the driving-blade, and the spiders are thus in their normal positions, when the circuit through the wires is completed by the piston $15^a$, which permits the current to operate upon the returning-magnet, as described.

From the above description it will be observed that the air-check piston $15^a$ is the agent which finally closes the circuit through the returning-magnet 54, but that such piston has no effect upon the returning-magnet except when the motor-magnet has reached its extreme right-hand position, as it is in only such position that the dog-pin $11^c$, which moves with the motor-magnet, operates to close the switch 72 by causing the switch-bar to contact with the pin $72^c$. In like manner the closing of the switch 72 when the motor-magnet has reached such position does not operate to return the motor-magnet until the lock-bar has been withdrawn from the spiders and they have had time to assume their normal positions, which is secured by the retarded movement of the air-check piston $15^a$ delaying its contact with the springs $d'$ $d$, which are in and operate to finally close the returning-magnet's circuit. As is evident, such withdrawal of the lock-bar must be delayed until the casting is effected. Therefore the lock-releasing magnet 53 is provided, which, though it can be operated by means of the correcting-key in the manner described, is primarily designed to effect the return of the lock-bar after completing a casting. For this purpose the contact 70 is formed integral with gear-wheel 56 and adapted to coöperate with the brushes 71 and close a circuit through said parts, the wires $c$ $c'$ $c^2$, the battery A, and the lock-releasing magnet 53 thus actuating the same to lift the pawls 22 $22^a$ and permit the spring $15^b$ to withdraw the lock-bar, as described in explaining the correcting-key. The contact 70 is so located upon gear-wheel 56 that it does not coöperate with brushes 71 until said gear-wheel has almost completed the revolution effecting the casting operations. By the time said coöperation occurs the mold has been removed from the matrices, carrying within it the linotype. The spiders are therefore in readiness for the distribution the contact initiates.

By referring to the diagram Fig. 38 the circuit of the returning-magnet can be clearly traced. A wire $d^2$ conveys the current from one pole of the battery B to the pin $72^a$. Thence through the arm 72' the current passes to pin $72^b$, thence through wire $d^3$, through the coil of the returning-magnet 54, thence through wire $d^4$ to one of the spring-contacts $d'$, thence through the air-check piston $15^a$ to the other spring-contact $d''$, and from thence through wire connection $d^5$ to remaining pole of battery B. The parts indicated in diagram are more clearly shown in Figs. 32 and 33; but in Fig. 33 the battery B is for convenience of drawing placed differently relative to the parts described. It is equally operative, of course, wherever placed if the parts mentioned are in its circuit.

The keyboard 29 is fixed upon the frames 1 $1^a$ and is formed, as shown in Fig. 43, with central and lower conducting-plates $29^a$ and $29^b$, separated by insulating material and connected with the terminals of battery A by wires $b$ $b^2$. The top of the keyboard is formed of a conducting-plate $29^c$, connected with one of the terminals of battery B by wire $a^5$, and each key is formed with head 5', attached by an elastic metallic spring $5^a$ to such plate. The head is provided with three grooves, as shown in Fig. 39, the spring $5^a$, which may be termed the "primary strip," being fitted to the central groove and two other movable strips or wires $5^b$ being fitted to the adjacent grooves and connected, respectively, with the conducting-plates $29^a$ and $29^b$, as shown in Fig. 43. These primary and secondary strips project downward through a hole $h$ in the keyboard beneath each head and are provided at their lower ends with so-called "key-hooks" $5^c$ and $5^d$, respectively, and the hook-board 28 is provided with a series of so-called "hooks" $28^c$ and $28^d$, adapted to engage the key-hooks $5^c$ and $5^d$. The hooks $28^c$ $28^d$ are in electrical connection with the motor, brake, lock, and releasing-magnets through conductive strands $b'$ $b^2$ $a'$ of the connectors $28^e$. The connectors $28^e$, as will be seen in Figs. 1, 58, 59, and 60, have their rear ends attached to the motor-magnet and are made flexible to accommodate them to its lateral reciprocation. This flexibility is secured by employing connectors similar in construction to those commonly used in conjunction with telephone-receivers, electric lamps, &c. They are composed of the three said strands $b'$, $b^2$, and $a'$, which are formed of a number of fine wires twisted to form a cord and insulated. These strands are then bound together by a woven covering. (See Figs. 41, 60, and 62.) For convenience the connectors are then joined to the motor-magnet side by side in rows on horizontal lines across its periphery, as shown in Figs. 1 and 62, and from thence their strands are carried to the proper coils and bars. In Fig. 1 only one of such rows is shown in order to simplify the drawing. In Fig. 58 I have for the same reason shown only two connectors attached to the motor-magnet. The manner of distributing the conductors $b'$, $b^2$, and $a'$ of these connectors upon the motor-magnet and its attachments is clearly shown in Figs. 59, 60, 62, and 63. It is to be understood that in these figures, particularly Figs. 60 and 62, that the conductors are drawn somewhat larger than their normal proportions in order to render the details clearer and plainly indicate the manner of placing and connecting them. In these two figures I have also marked the continuation of the conductors $b'$ $b^2$, after junction $b^4$ and $b^5$, as this enables me to make the description more lucid. These reference-numbers do not appear in the preceding figures. As will be seen on reference to Fig. 60, the conductors $b'$ of the upper connector $28^e$ and $b^2$ of the lower connector are joined to a common conductor $b^4$, while the conductors $b^2$ of the upper connector and $b'$ of the lower connector are joined to a common conductor $b^5$. These joints are soldered and then wrapped with an insulating-covering $b^7$. The object of this construction is to lessen the multiplicity of wires that would result if each of the conductors $b'$ $b^2$ were carried to the magnet-coils $11^e$. The manner of joining the conductors $b^4$ $b^5$ to the terminals $11^j$ of the magnet-coils $11^e$ is clearly shown in Figs. 60, 62, and 63. The two terminals and the conductor are bunched together, as shown in enlarged section by Fig. 63, and soldered, after which an insulating-covering $b^6$ is wrapped about the joint. In Fig. 60 the conductors $b^4$ and $b^5$ are shown lifted from their normal positions that they may be clearly seen. The current flowing through the commutator-bars $43$ $43^a$ is led to them through conductors $a''$, which are branches of the conductor $a'$, the remaining member of the trio of conductors comprising the connectors $28^e$. As will be seen on referring to Figs. 60 and 62, the conductors $a'$ are laid upon the face of the motor-magnet, alternating thereon with the conductors $b^4$, (or $b^5$, if on the lower side.) Each conductor $a'$ is carried to a point on the face of the magnet lying in a plane perpendicular to a diameter of the commutator passing through two opposite pairs of commutator-bars. At this point it is bent to a right angle and carried parallel to the axis of the motor-magnet toward its right side, as shown in Fig. 62. It is then bent over the edge of the motor-magnet and laid against the side thereof in coincidence with a radius of the motor-magnet and continuing along this line terminates in the junction $a^i$ near the angle formed by the union of brass ring $47$ and the motor-magnet. (See Figs. 60 and 62.) As this process continues the portions of the conductors $a'$ that are bent to a right angle and first put in place are overlaid by subsequent additions of conductors $b^4$, $b^5$, and $a'$, resulting in firmly binding them in place. These overlaid conductors are indicated by dotted lines in Fig. 62. As shown in Fig. 62 and indicated by dotted lines in Fig. 60, the feet of the bridge $11^b$ are channeled on the side next the motor-magnet to permit certain of the conductors $a'$ to pass beneath them. In Fig. 62 four of the upper conductors $a'$ are broken away near the right edge of the motor-magnet in order to show the topmost conductor entirely. At the junction $a^i$ conductor $a'$ is joined to two branches $a''$, which are united with it in a manner similar to that employed for uniting the conductors $b^4$, $b^5$, and the coil-terminals $11^j$. One of the said branches $a''$ is carried to a bar in the inner row of commutator-bars $43$ and the other to a bar in the outer row $43^a$ and diametrically opposite. In order to effect this neatly, the conductors are laid side by side upon the face of the rings $47$ and $47^a$, the conductor being bent to a right angle and parallel to the axis of motor-magnet and carried to the proper commutator-bar in a manner similar to that described for the conductors $a'$ and clearly shown in Fig. 62. As this process continues it becomes necessary to lay part of the conductors upon the right-angled portions of those first laid, the said portions being indicated by dotted lines in Fig. 62. Radial channels are cut in the side of the commutator next the iron brake-ring $47^a$, through which the conductors $a''$ are carried to the commutator-bars. These channels are shown in Fig. 62 in end elevation and in Fig. 59 in horizontal section on line P P of Fig. 60. In Fig. 60 dotted lines indicate the conductors in two of these channels. On referring to Figs. 59 and 60 it will be seen that holes are bored through the commutator-bars, into which the terminals of the conductors $a''$ are inserted. To insure perfect electrical connection, they are then soldered to the bar. The coils $11^e$ upon the motor-magnet are, as shown in Fig. 38, in electrical connection with one another, and the poles of its magnetic field are shifted by connecting the battery-terminals at will to coils diametrically opposite. As said opposite coils are connected, respectively, with hooks $28^d$ by conductive strands $b'$ and $b^2$ of the connectors $28^e$ and the key-hooks $5^d$ with the terminals of battery A, a circuit is established through such magnet-coils by depressing a key. (See Figs. 13 and 38.) The connection of the secondary hooks $5^d$ and $28^d$ thus determines the position of the "consequent poles," while the connection of the primary hooks $5^e$ and $28^e$ directs a current through the brake-magnet, the lock-magnet, and the releasing-magnet.

To operate the machine, the lock-bar is wholly withdrawn from the spiders and the hook-board drawn rearwardly by the operation of the rotating catch $34^a$, (see Fig. 27,) thus placing the hooks upon the hook-board in readiness to engage the key-hooks. The weight $3^f$ upon each spider and the weight of the brake-magnet $44$ acting upon the registering-magnet $10$ turn those parts into position for the driving-blade $13$ to engage the slots $s$ in the spider-hubs. The driving-blade $13$ is then engaged with all the spiders, and the motor-magnet thus surrounds the entire pile of spiders, excepting one or two at the left end of the pile. Upon a finger-key being actuated, a circuit is established through the coils of the motor-magnet, battery A, the key and wires $b$ $b'$ $b^2$ $b^3$ intervening, as shown in Figs. 13 and 38, the current, dividing at the entrance-coil and reuniting at the discharge-coil, causing consequent poles N S in the desired relation to the registering-magnet 10. The registering-magnet instantly turns and places its longer axis coincident with such consequent poles, thus revolving the entire pile of spiders and bringing the desired matrix to the casting position, said matrix being indicated by the character upon the operated key. As this occurs the arms 42, 42$^a$, and 44$^a$, the registering-magnet 10, and the spring 46 are all in alinement and a circuit is closed through a commutator-bar 43, the roll 41, the arm 42, the brake-magnet's coil 44$^c$, the wire $a$, the collar 48$^a$, the brush 48, and the remainder of the circuit common to the lock and brake magnets, thus energizing the brake-magnet 44 and holding it and the hub 45 immovable where adjusted by the registering-magnet. The momentum of the pile of spiders and the registering-magnet then expends itself upon the spring 46, carrying it beyond its normal position, as shown in dotted lines 10$\frac{1}{2}$ in Fig. 22. The recoil of the spring 46 and the influence of the motor-magnet upon the registering-magnet tend to check such oscillations and return the spring 46 to its normal position. The spring having assumed its normal position, a current is shunted from commutator-bar 43$^a$ through the contact-roll 41$^a$, the arm 42$^a$, the spring-plate 42$^b$, the spring 46, wire $a$, collar 48$^a$, brush 48, and wire $a^2$ to the lock-magnet 20 to move the lock-bar 14 forward one step. The resistance of the brake-magnet is adjusted, as previously described, to prevent an energizing current reaching the lock and releasing magnets prior to these movements. As the lock-magnet is not energized until the desired matrix is correctly placed, it follows that the lock-bar 14 engages the proper arm upon the spider next to its advancing end, and such spider is therefore locked in the desired position. The shunted current passes through the releasing-magnet 32 as well as the lock-magnet 20, thus releasing the latch of the hook-board and permitting the spring 38 to press it forwardly, disengaging the key-hooks and breaking all the circuits. To permit the completion of these electrical operations before the key-hooks are disengaged, the release of the key, due to the energizing of the releasing-magnet, is slightly retarded by the formation of the hooks, which retain their contact during a fraction of the movement through which they are carried by the hook-board. The justifiers 3$^c$, which are inserted between the different words in the line, serve to make the mold tight when the matrices are pressed upon the mouth of the same, as the edges of the justifiers are fitted accurately to the sides of the mold and project into the same, as shown in Fig. 7, to form notches or blank spaces in the edge of the linotype-casting. The above-described operations occurring with great swiftness bring to the casting position a matrix for a single character in a line, and the remaining matrices, spaces, justifiers, and blanks are alined in the same position by like operations. As the composition of the line progresses the number of spiders rotated with the driving-blade 13 is diminished and the number engaged by the lock-bar 14 progressively increased, the spiders being successively locked by the bar 14 and released by the blade 13 as they are adjusted. As the end of the line is approached and but a limited number of spiders remain unlocked it is necessary to warn the operator, that he may intelligently set the remainder of the line in case the closing word requires more spiders for its composition than remain unlocked. To give such signal, I provide upon the keyboard a bell 50, (shown in Figs. 1, 5, 46, and 48,) with a hammer 49, having an elastic arm 49$^a$ mounted upon a vertical extension 99$^a$ of guide-bar 99, and which is engaged by a toe 49$^b$, moved with the motor-magnet, as the latter approaches the desired point. The arm is made elastic that it may yield when the toe is carried beyond the alarm-point by the shifting of the motor-magnet as the remaining spiders are set. (See dotted lines in Figs. 5 and 48.) A spring 49$^c$ is provided to hold the arm 49$^a$ normally away from the bell and the base of the toe slotted for adjustment that signal may be given at any desired point. Should the final word contain more letters in one syllable than can be composed with the remaining spiders, the operator repeatedly strikes a key marked "Blank," which turns the blank-arm 3$^x$ upon each of the remaining spiders into coincidence with a radius of the spider passing through the axis of the lock-bar, as indicated by the dotted reference-sign 3$^x$ in Fig. 53 and further shown in the sectional views, Figs. 8 and 9. By so turning the blanks 3$^x$ to said position the spiders bearing them are rendered inoperative to produce characters or spaces upon the linotype and an opening in the pile of spiders is provided for the entrance of the horn 2$^4$, that it may coöperate with the last matrix set, and thus cause it to be at the extremity of the line during the casting of the linotype. (See Figs. 8, 9, and 61.) The full number of spiders not being employed, more space is left for the justifiers to fill; but they are capable of filling the space not occupied by the several spiders omitted. Such spiders as have set a blank are successively locked by the lock-bar, being retained in the proper position by the arms 3$^a$ adjacent to blank 3$^x$, coöperating with the lock-bar, (see Fig. 53,) and the operator then pulls the handle 51 to connect the clutch 58 with clutch-hub 7 and cause shaft 6 to automatically operate the melting-pot, mold-cooling devices, ejector, and galley-feed. Before the mold is pressed upon the matrices to make the casting it is necessary to support them against the pressure of the mold, and I therefore furnish a support upon the inner side of the motor-magnet for the advancing end of the lock-bar 14. Such end of the lock-bar is formed, as shown in Figs. 15 and 16, with a cross-brace 14ᵉ, which arches over the slot in the lock-bar, at its forward end, at a sufficient height from its outer face to pass over the matrices upon the spider-arms, as shown in Fig. 15. Such brace projects laterally at the free end of the lock-bar and is provided with ribs at its opposite edges, and the lock-support 11ˣ is attached to the contiguous corner of the motor-magnet and formed with ribs to engage the same. As the lock-bar is fed forward but one step each time a spider is adjusted, it is necessary to provide additional means for feeding it forward into engagement with the lock-support after the last spider is set. Such means are provided upon the gear-wheel 56, which is shown in Figs. 3, 38, and 45, provided with four contacts 55, cast integral with and formed projecting from the gear-wheel 56, and adapted to operate upon brushes 57, as shown in the electrical diagram Fig. 38, to close a circuit from the battery A and lock magnet 20. The contacts 55 are so arranged in proximity to the brushes 57 that when the gear-wheel 56 is first set in motion through the operator's movement of the handle 51 the contacts (by coöperation with the brushes 57) automatically close the circuit several times in succession, thus repeatedly actuating the lock-magnet 20 and moving the lock-bar 14 into engagement with the lock-support 11ˢ. As will be seen by reference to Fig. 38, the circuit of the lock-magnet under these conditions is entirely different from its circuit during composing. The battery A furnishes current instead of battery B, and the releasing-magnet is not in the circuit, the circuit being limited entirely to the circuit-closing contacts 55 of gear-wheel 56, the brushes 57, the magnet 20, the battery A, and necessary connecting-wires, as c, c⁴, and a³. The advancing of the lock-bar is effected before the movement of the mold brings it into contact with the matrices or the advancing horns have entirely compressed the line of matrices. The rotation of the shaft 6 causing these movements tips the melting-pot forward, thus bringing the inclined sides of the horns 2ᵈ into contact with the spider-arms at the ends of the composed line, as shown in Fig. 6. The downward movement of the horns operates to crowd the spider-arms toward one another, as shown in Figs. 7 and 9, thus compressing the justifiers 3ᵉ and causing the adjacent sides of the matrices to fit tightly against one another to retain the fluid metal. The flaring sides 2ᵉ upon the mouth of the mold press upon the beveled faces at the opposite edges of the matrices, as shown in Fig. 49, and the movement of the mold toward the spider-arms serves to bring the matrices in a straight line by the yielding of the india-rubber core 4ᵇ beneath the hubs of the spiders, as is clearly illustrated in Fig. 7. It is obvious that the tipping of the lateral spiders inwardly when drawn together by the horns upon the mold tends to diminish their projection from the elastic core, and the movement of the mold is so adjusted by means of the cam 7² and the spring connection 61ᵇ that it is forced upon the matrices until those intermediate to the ends of the composed line are pressed inward to the same length as the outer arms, thus indenting the elastic core upon one side, as shown in Fig. 7. The hub of each spider is mounted upon an independent ball-race 3ᶜ, so that each may indent the rubber core independently to the required degree. The continued rotation of shaft 6 causes the casting, cooling, and ejection of the linotype, the return of the melting-pot, the distribution of the spiders, and the release of the motor-magnet. The machine is then in readiness to set a new line. I have specified throughout batteries for operating my invention, but do not restrict myself to batteries. Any suitable source of electricity would answer as well. I have not illustrated in the drawings the full number of pole-pieces, matrices, &c., that would be required in practice in preparing linotypes for printing, as more than a hundred characters are used in ordinary typography.

It is obvious that the number of pole-pieces, matrices, &c., may be increased or diminished without departing from the substance of my invention, as the mechanism and its operation would be the same for each of said parts. I have specified an annular motor-magnet having pole-pieces, as the pole-pieces concentrate the magnetic flux at the poles; but it is obvious that consequent poles could be created in an annular electromagnet without pole-pieces. I therefore do not restrict myself to a motor-magnet having pole-pieces, but claim, broadly, a motor-magnet electrically energized.

Having thus set forth the nature of my invention, what I claim herein is—

1. In a linotype-machine, the combination, with a line of matrices, of an oscillating melting-pot with a nozzle carried thereby through an arc of a circle to and from the line of matrices, and a mold formed upon the nozzle and adapted, with the matrices, to form a linotype-casting thereon.

2. In a linotype-machine, the combination, with a line of matrices, of a melting-pot with a nozzle, a mold formed integral with the nozzle, and an ejector movable through the mold-cavity and operating to force the metal into the mold and form the base of the casting therein.

3. In a linotype-machine, the combination, with a line of matrices, of a melting-pot with a nozzle, a mold formed integral with the nozzle, and an ejector with means for moving it through the mold across the nozzle, the ejector operating to control the flow of the molten metal, to compress the metal in the mold and to force the linotype out of the mold.

4. In a linotype-machine, the combination, with a line of matrices, of a melting-pot having a mold attached thereto and provided with an ejector and movable to and from the line of matrices to make a casting thereon, the mold having a water-chamber about the same with inlet and outlet water-pipes, a tank below the level of the mold with pump and connection to such inlet-pipe, an inwardly-opening valve near the top of the inlet-pipe, and an extension of the outlet-pipe to the tank for siphoning out the water in the mold when the supply is stopped, substantially as herein set forth.

5. In a linotype-machine, the combination, with a line of matrices, of an oscillating melting-pot with a nozzle carried thereby through an arc of a circle, a mold formed integral with the nozzle, means for oscillating the melting-pot to move the mold to and from the line of matrices, an ejector movable through the mold, and means operated by the movement of the melting-pot to actuate the ejector.

6. In a linotype-machine having a line of matrices and a receiver, adjacent to one another in substantially a horizontal plane, the combination, with such matrices and receiver, of a pivoted melting-pot having a nozzle at one side adapted to oscillate over the receiver to and from the matrices, a mold attached to the nozzle, an ejector movable through the mold with means for operating it to discharge the linotype when the nozzle is raised and the mold is above the receiver, and the receiver having reversely-inclined planes to reverse the linotype, and a chute for delivering the linotype in a reverse position to the galley.

7. In a linotype-machine, the combination, with a line of matrices with upwardly-projecting impression-faces, of a mold movable downwardly and upwardly to and from such line of matrices, an ejector operated to discharge the linotype from the mold when raised, a receiver having reversely-inclined planes to reverse the linotype, a chute extended from the inclined planes to the horizontal bed of a galley, and a reciprocating plunger to shift the linotypes in succession laterally from the chute, substantially as herein set forth.

8. In a linotype-machine, the combination, with a line of matrices with upwardly-projecting impression-faces, of a mold movable downwardly and upwardly to and from such line of matrices, an ejector operated to discharge the linotype from the mold when raised, and a receiver having an inclined plane to receive the linotype with reversely-inclined plane to reverse the same, both planes being sloped laterally and having a lateral chute connected with their lower sides to deliver the linotype to a galley.

9. In a linotype-machine, the combination, with a line of matrices with upwardly-projecting impression-faces, of a mold movable downwardly and upwardly to and from such line of matrices, a chute below the position assumed by the mold when elevated, an ejector operated to discharge the linotype to the chute, a movable galley-bar having a transverse head to support the linotypes, and a plunger provided with a cam to force the linotype from the chute toward such head at each casting operation, a weight to press the head normally toward the chute, and spring-catches to engage the ends of the linotype when pressed from the chute, substantially as herein set forth.

10. In a linotype-machine having matrices and a melting-pot carrying a mold and operating to supply the same with fluid metal, the combination, with such matrices, melting-pot and mold, of a stationary mandrel, a series of matrix-bearing spiders rotatable upon such mandrel, means for rotating the spiders to set the desired matrices at a given casting-line, and means for moving the melting-pot to support the mold in contact with the matrices upon such casting-line, substantially as herein set forth.

11. In a linotype-machine having matrices and a pivoted melting-pot with nozzle at one side bearing a mold, the combination, with such matrices, melting-pot and mold, of a stationary mandrel, a series of matrix-bearing spiders rotatable thereon, means for rotating the spiders to set the desired matrices at a given casting-line, means for oscillating the melting-pot to support the mold in contact with the matrices, a gas-furnace attached to the bottom of such melting-pot and provided with gas-burners, and flexible connections for supplying gas to such burners, whereby the connection may be unbroken as the pot is oscillated.

12. In a linotype-machine employing a series of rotatable matrix-bearing spiders and means for compressing the ends of the same when assembled in given order, a spider having arms transversely flexible most of which bear upon their ends diverse matrices, with one of said arms shortened to form a blank in the line when the matrices are assembled, as and for the purpose set forth.

13. In a linotype-machine, a matrix-bearing spider having flexible arms provided upon their ends with matrices having tapering sides, the tapering sides of such matrices being adapted to form a joint and make alinement with a mold having flaring lips and jaws $2^d$ to bring the matrices into lateral contact.

14. In a linotype-machine, a matrix-bearing spider having arms transversely flexible provided severally upon their ends with diverse matrices and with a compressible justifier comprising two flexible strips attached at their ends and formed with parallel sides intermediate to the ends, substantially as herein set forth.

15. In a linotype-machine, the combination, with a stationary mandrel, of a series of matrix-bearing spiders having arms transversely flexible, provided severally upon their ends with diverse matrices, means for rotating the spiders to set the desired matrices at a given casting-line, and a mold having the flaring jaws $2^d$ to bring the matrices into lateral contact.

16. In a linotype-machine, the combination, with a stationary mandrel, of a series of matrix-bearing spiders having arms transversely flexible and provided upon their ends with matrices having tapering sides, means for rotating the spiders to set the desired matrices at a given casting-line, and a melting-pot having an integral mold with the flaring jaws $2^d$ to bring the matrices into lateral contact, and the flaring lips $2^{c'}$ fitted accurately to the tapered sides of the matrices, and means for moving the melting-pot to press the mold upon the matrices, substantially as herein set forth.

17. In a linotype-machine, the combination, with a mandrel, of a rotatable matrix-bearing spider having arms transversely flexible, one of such arms having upon the end a compressible justifier, and the greater number of the arms having diverse matrices upon the ends, and the spider having a weight at one side to turn it normally into a given position upon the mandrel, substantially as herein set forth.

18. In a linotype-machine, the combination, with a mandrel, of a rotatable matrix-bearing spider having arms transversely flexible, one of said arms being provided with a compressible justifier, one with a solid spacer, and one shortened to form a blank, the greater part of the arms having diverse characters upon the ends and the spider having a weight at one side to turn it normally into a given position upon the mandrel, as and for the purpose set forth.

19. In a linotype-machine, the combination, with a mandrel, of a series of rotatable matrix-bearing spiders having arms provided with matrices bearing diverse characters, a melting-pot provided with trunnions and with a mold moved by the melting-pot to and from a casting-line across the peripheries of the spiders, the pot having a rocker-arm and being so adjusted upon the trunnions that the weight of the pot retracts the mold normally from the spiders, and the linotype-machine having a rotary shaft with reciprocating connection to the rocker-arm to move the pot with the mold into contact with the spider-arms when required, substantially as herein set forth.

20. In a linotype-machine, the combination, with a mandrel, of a series of rotatable matrix-bearing spiders having arms provided with matrices bearing diverse characters, a melting-pot provided with trunnions and with a mold moved by the melting-pot to and from a casting-line across the peripheries of the spiders, the pot having a rocker-arm and being so adjusted upon the trunnions that the weight of the pot retracts the mold normally from the spiders, and the linotype-machine having a shaft carrying a rotary cam and a spring connection between such cam and the rocker-arm to move the pot with the mold into contact with the spider-arms when required, substantially as herein set forth.

21. In a linotype-machine, the combination, with a mandrel, of a series of rotatable matrix-bearing spiders having arms provided with matrices bearing diverse characters, a melting-pot provided with trunnions and with a mold moved by the melting-pot to and from a casting-line across the peripheries of the spiders, the pot having a rocker-arm and being so adjusted upon the trunnions that the weight of the pot retracts the mold normally from the spiders, and the linotype-machine having a shaft connected by clutch with a continuously-rotating driver, a connection to the rocker-arm reciprocated by the shaft when rotated, a lever adjacent to the melting-pot for detaching the clutch, and a hinged dog upon the melting-pot for actuating such lever to disengage the clutch and stop the shaft when the mold is retracted from the spider-arms, substantially as herein set forth.

22. In a linotype-machine, the combination, with a mandrel, of a series of spiders having each a hub with ball-bearing fitted to turn freely upon the mandrel, a slot in each hub to engage a driving-blade, transversely-flexible arms having diverse characters upon the ends, a driving-blade movable longitudinally to fit the slots, a weight upon each spider to bring the slots normally into alinement, means for rotating the blade around the mandrel to adjust the matrices, and a mold fitted to the matrices when adjusted, substantially as herein set forth.

23. In a linotype-machine, the combination, with a series of spiders having flexible arms carrying a series of matrices, a spacer, a compressible justifier, and one arm abbreviated to form a blank, of a mold and means for moving it to and from a casting-line across the peripheries of the spiders, means for setting the desired matrices, spaces, blanks or justifiers at such casting-line, and means for compressing the line to the required length.

24. In a linotype-machine, the combination, with a series of spiders having flexible arms carrying a series of matrices, a spacer, a compressible justifier, and one arm abbreviated to form a blank, of a mold and means for moving it to and from a casting-line across the peripheries of the spiders, means for setting the desired matrices, spaces, blanks and justifiers at such casting-line, means for locking the adjusted spider-arms, and means for compressing the line to the required length.

25. In a linotype-machine, the combination, with a mandrel, of a yielding spider-core about such mandrel, a series of annular ball-seats upon such core, a series of hubs with balls rotatable upon such seats, spider-arms projected from each hub with matrices upon their ends, and a mold movable to and from the periphery of the spiders, and provided with inclined horns at its ends to compress the line of matrices, substantially as herein set forth.

26. In a linotype-machine, the combination, with a mandrel, of a yielding spider-core about such mandrel, a series of annular ball-seats upon such core, a series of hubs with balls rotatable upon such seats, spider-arms projected from each hub with matrices upon their ends, a slotted lock-bar embracing the adjusted arm, and a pivoted melting-pot carrying a mold to and from the matrices, the mold having at its ends inclined horns curved to pass through the slotted lock-bar, substantially as herein set forth.

27. In a linotype-machine, the combination, with a mandrel, of a yielding spider-core about such mandrel, a series of annular ball-seats upon such core, a series of hubs with balls rotatable upon such seats, spider-arms projected from each hub carrying a series of matrices, a spacer, and a compressible justifier, and one arm abbreviated to form a blank, and a mold movable to and from the peripheries of the spiders with inclined horns to compress the line of arms to the same length as the mold.

28. In a linotype-machine, the combination, with a line of matrices, of a melting-pot having a nozzle with mold integral therewith and provided with an ejector and movable to and from the line of matrices to make a casting thereon, the mold having a water-chamber about the same with inlet and outlet pipes, and the interior of the melting-pot adjacent to the mold having a non-conductive lining to prevent the conduction of heat from the melted metal to the mold.

29. In a linotype-machine, the combination, with a line of matrices, of a melting-pot having a nozzle with mold integral therewith, and provided with an ejector and movable to and from the line of matrices to make a casting thereon, the mold having a water-chamber about the same with inlet and outlet pipes, and the interior of the melting-pot adjacent to the mold having a non-conductive lining to prevent the conduction of heat from the melted metal to the mold, the said lining having notches 2' expanded toward the mold, to clear the metal therefrom if chilled, substantially as herein set forth.

30. In a linotype-machine having a mold attached to the melting-pot, the combination, with the melting-pot having bottom sloping toward a nozzle as set forth, of a mold integral therewith, a line of matrices fitted to the mold when casting a linotype, an ejector movable through the melting-pot and operating as a gate to the mold, means for holding the ejector normally within the mold, means for withdrawing it wholly from the mold to admit the metal thereto, means for replacing it partially in the mold to compress the congealing metal and form the back of the linotype, and means for forcing it through the mold to eject the linotype when cast, substantially as herein set forth.

31. In a linotype-machine, a melting-pot having a sloping bottom and integral nozzle having a mold-cavity with mold-plate to cover such cavity, and formed with guides for an ejector, an ejector fitted to such guides and extended outside of the nozzle, and gearing upon the pot for reciprocating the ejector through the mold, as and for the purpose set forth.

32. In a linotype-machine, the combination, with a series of matrix-bearing spiders mounted side by side upon a mandrel and having a driving-blade fitted thereto, of a mold with means for moving it to and from a casting-line across the peripheries of the spiders, means for rotating the blade around the mandrel to successively adjust the spiders, means for locking each spider when adjusted, and means for retracting the blade from each spider as it is locked, substantially as herein set forth.

33. In a linotype-machine, the combination, with a series of slotted matrix-bearing spiders mounted side by side upon a mandrel, of a mold movable to and from the periphery of the spiders, a blade movable parallel with the mandrel, and fitted to the slots through the spiders, a registering-magnet rotatable upon the mandrel for carrying such blade and adjusting the spiders, a multipolar motor-magnet with pole-pieces at intervals about its circumference corresponding to the matrices upon the spiders, an annular core carrying a series of coils, between the pole-pieces, and an electric circuit for energizing said core and pole-pieces, and creating "consequent poles" in the motor-magnet as desired, substantially as herein set forth.

34. In a linotype-machine, the combination, with a series of slotted matrix-bearing spiders mounted side by side upon a mandrel, of a mold movable to and from the periphery of the spiders, a blade movable parallel with the mandrel and fitted to the slots through the spiders, a registering-magnet rotatable upon the mandrel for carrying such blade and adjusting the spiders, a multipolar motor-magnet surrounding such registering-magnet, and an electric circuit, and connections and finger-keys in said circuit for connecting it to shift the "consequent poles" of such motor-magnet, substantially as herein set forth.

35. In a linotype-machine, the combination, with a series of slotted matrix-bearing spiders mounted side by side upon a mandrel, of a mold movable to and from the periphery of the spiders, a blade movable parallel with the mandrel and fitted to the slots through the spiders, a registering-magnet rotatable upon the mandrel for carrying such blade and adjusting the spiders, a multipolar motor-magnet with pole-pieces corresponding with the matrices upon the spiders, a core and coils for energizing such pole-pieces, an electric circuit, connections and finger-keys in said circuit for shifting the "consequent poles" as desired, and means for locking the spiders and retracting the blade from the same successively, substantially as herein set forth.

36. In a linotype-machine, the combination, with a series of slotted matrix-bearing spiders mounted side by side upon a mandrel, of a mold movable to and from the periphery of the spiders, a registering-magnet rotatable upon the mandrel with a connection, as the blade 13, for adjusting the spiders, a multipolar motor-magnet in ring form surrounding such registering-magnet, with bridges $11^a$ and $11^b$ at its ends fitted to the mandrel, pole pieces and coils upon the motor-magnet corresponding to the spider-arms, a commutator carried by said magnet, with concentric rows of contact-bars corresponding in number to the magnet-coils, a hub upon the mandrel adjacent to the registering-magnet, having a spring connection with said magnet, and provided with rolls to bear upon the commutator-contacts and closed circuits therethrough, and an electric circuit through the motor-magnet and connections with finger-keys, directed by the finger-keys to shift the consequent poles of the magnet at pleasure, substantially as herein set forth.

37. In a linotype-machine, the combination, with a series of slotted matrix-bearing spiders mounted side by side upon a mandrel, of a mold movable to and from the periphery of the spiders, a registering-magnet rotatable upon the mandrel with a connection, as the blade 13, for adjusting the spiders, a multipolar motor-magnet in ring form surrounding such registering-magnet, with bridges $11^a$ and $11^b$ at its ends fitted to the mandrel, pole-pieces and coils upon the motor-magnet corresponding to such spider-arms, a commutator carried by said magnet, with concentric rows of contact-bars corresponding to such coils, a hub upon the mandrel adjacent to the registering-magnet having a spring connection thereto, and provided with rolls to bear upon the commutator-contacts, an iron brake-ring attached to the motor-magnet, an arm carried by the registering-magnet and having a brake-magnet movable thereon, a spring to normally retract such magnet, and electric circuits, and connections and finger-keys, for energizing the motor-magnet and shifting its "consequent poles" at pleasure, and for energizing the brake-magnet when the registering-magnet is exactly adjusted, as and for the purpose set forth.

38. In a linotype-machine, the combination, with a series of slotted matrix-bearing spiders mounted side by side upon a mandrel, and a mold to coöperate with the same when adjusted, of a registering-magnet rotatable upon the mandrel, with a connection as the blade 13, for adjusting the spiders, and a multipolar motor-magnet comprising the annular core $11^d$ with pole-pieces $11^f$ and intermediate coils $11^e$ corresponding with the spider-arms, the coils having connections with finger-keys, for closing an electric circuit through the coils to shift the "consequent poles" of the motor-magnet, and adjust the registering-magnet and spiders, substantially as herein set forth.

39. In a linotype-machine, the combination, with a suitable frame, of the mandrel 4 having a series of matrix-bearing spiders rotatable thereon between fixed collars, an annular multipolar motor-magnet having pole-pieces corresponding with the spider-arms, bridges to support it movably upon the mandrel, and means for moving it step by step over the spiders, a registering-magnet movable with the motor-magnet and having the blade 13 fitted to coincident slots in the spiders, a coil upon the motor-magnet for each pole-piece, a finger-key for each pole-piece in connection with the opposite coils, and an electric circuit embracing said coils, connections and a finger-key for energizing said motor-magnet to shift its "consequent poles," substantially as herein set forth.

40. In a linotype-machine, the combination, with a suitable frame, of the mandrel 4 having a series of slotted matrix-bearing spiders rotatable thereon between fixed collars, an annular motor-magnet having pole-pieces corresponding with the spider-arms, bridges to support it movably upon the mandrel, a registering-magnet movable with the motor-magnet and having the blade 13 fitted to coincident slots in the spiders, a spring operated to move the motor and registering magnets with such blade and press it normally into the spider-slots, ratchet mechanism to retract the motor-magnet, registering-magnet, and blade, step by step from the spiders, a coil upon the motor-magnet for each pole-piece, a finger-key for each pole-piece in connection with two opposite coils and with means for initiating said retraction and two circuits one embracing such coils, connections and finger-keys, for energizing the motor-magnet, to adjust the registering-magnet and a spider and the other embracing said key, connections and means for initiating the retraction of the blade from the spider when adjusted, substantially as herein set forth.

41. In a linotype-machine, the combination, with a suitable frame, of the mandrel 4 having a series of slotted matrix-bearing spiders rotatable thereon between fixed collars, an annular motor-magnet having pole-pieces corresponding with the spider-arms, bridges to support it movably upon the mandrel, a registering-magnet movable with the motor-magnet and having the blade 13 fitted to coincident slots in the spiders, a spring upon the mandrel to move the motor and registering magnets to press such blade normally into the spider-slots, ratchet mechanism to retract the motor-magnet, registering-magnet, and blade, step by step from the spiders, a coil upon the motor-magnet for each pole-piece, a key for each pole-piece in connection with two opposite coils, and an electric circuit embracing said coils, connections and key, to actuate the registering-magnet and adjust characters upon each spider in the desired position, a locking-bar advanced step by step to secure each of the spiders when adjusted, a melting-pot with mold operated to make a casting when all the spiders are adjusted, a lock-releasing magnet connected with the ratchet mechanism of the lock-bar and means for closing a circuit through such lock-releasing magnet when the mold is retracted from the spiders, substantially as herein set forth.

42. In a linotype-machine, the combination, with a suitable frame, of the mandrel 4 having a series of slotted matrix-bearing spiders rotatable thereon between fixed collars, an annular motor-magnet having pole-pieces corresponding with the spider-arms, bridges to support it movably upon the mandrel, a registering-magnet movable with the motor-magnet and having the blade 13 fitted to coincident slots in the spiders, a returning-spring upon the mandrel to move the motor and registering magnets to press such blade normally into the spider-slots, ratchet mechanism to retract the motor-magnet, registering-magnet, and blade, step by step from the spiders, a coil upon the motor-magnet for each pole-piece, a key for each pole-piece in connection with two opposite coils, and an electric circuit embracing said coils, connections and key, to actuate the registering-magnet and adjust the matrices upon each spider in the desired position, a locking-bar advanced step by step to secure each of the spiders when adjusted, a melting-pot with mold operated to make a casting when all the spiders are adjusted, means for retracting the lock-bar from the spiders when the linotype is cast, a detent for holding the motor-magnet when adjusted step by step, a returning-magnet for withdrawing such detent, and means actuated by the final movement of the lock-bar for closing a circuit through such returning-magnet and thus withdrawing the detent from the motor-magnet to permit the operation of the returning-spring, substantially as herein set forth.

43. In a linotype-machine, the combination, with a suitable frame, of the mandrel 4 having a series of matrix-bearing spiders rotatable thereon between fixed collars, an annular motor-magnet movable over such spiders with pole-pieces and coils corresponding with the spider-arms and carrying a registering-magnet to adjust the spiders, a keyboard with keys connected with a source of electricity, a movable hook-board with hooks having circuit connections with said coils and adapted to engage hooks upon the keys when a key is depressed to close a circuit through the coils, a rack and pinion for shifting the motor-magnet step by step when adjusting the spiders, a spring and rotating catch for reciprocating the hook-board after each actuation of the registering-magnet, a ratchet-wheel connected with the pinion and actuated by a pawl upon the hook-board, and a detent for retaining the pinion in its advanced position, substantially as herein set forth.

44. In a linotype-machine having a series of matrices assembled and adjusted by the operation of keys and electric circuits controlled by the keys, the combination, with a keyboard composed of conductive plates each insulated from the other and in connection with one of the terminals of a source of electricity, of a series of elastic, metallic keys mounted on said keyboard in electrical connection with one of its plates, said keyboard being pierced beneath the keys and each key having a key-hook projected downward through the keyboard and adapted to engage one of a series of detachable hooks arranged below such keyboard, in correspondence with the key-hooks, and to close circuits therethrough, connections between said hook and a coil on a motor-magnet, connection between a second coil on the motor-magnet wound opposite the first, and the other terminal of the source of electricity and means for disengaging said hook when the matrix corresponding to a given key is adjusted, substantially as herein set forth.

45. In a linotype-machine having a series of matrices assembled, adjusted and locked by the operation of keys and electric circuits controlled by the keys, the combination, with a keyboard composed of conductive plates, each insulated from the other, one of said plates being in connection with one terminal of a source of electricity, of a series of elastic metallic keys mounted on said keyboard in electrical connection with one of its plates, said keyboard being pierced beneath the keys and each key having a key-hook projected downward through the keyboard and adapted to engage one of a series of detachable hooks arranged below such keyboard in correspondence with the key-hooks to close circuits therethrough, connection between each hook and electric locking devices joined to the other terminal of the source of electricity and means for disengaging said key-hook when the matrix corresponding to a given key is locked, substantially as shown and described.

46. In a linotype-machine having a series of matrices assembled and adjusted by the operation of keys controlling electric circuits, the combination, with a keyboard bearing keys having key-hooks, each key-hook insulated from the other and connected with one of the terminals of a source of electricity, of a hook-board, and a series of hooks mounted thereon in correspondence with the key-hooks and in connection with a motor-magnet and adapted to engage the key-hooks and close circuits through the source of electricity, the keys, and the motor-magnet to assemble and adjust the matrices, substantially as shown and described.

47. In a linotype-machine having a series of matrices assembled, adjusted and locked by the operation of keys and electric circuits controlled by the keys, the combination, with a keyboard bearing keys having key-hooks connected with one of the terminals of a source of electricity, of a hook-board and a series of hooks mounted thereon in correspondence with the key-hooks and connected with electrical locking devices joined to the other terminal of the source of electricity, and adapted to engage the key-hooks and close a circuit therethrough to actuate the locking devices to lock the matrices when adjusted, substantially as shown and described.

48. In a linotype-machine having a series of rotatable matrix-bearing spiders, with a registering-magnet to adjust the same, and a motor-magnet with coils and circuit-wires to produce "consequent poles" corresponding to the arms upon the spiders, the combination, with the opposed terminals of such circuit-wires, of a series of hooks mounted upon a reciprocating hook-board and adapted to engage the key-hooks on keys when depressed to them, and a keyboard having a series of keys mounted thereon in connection with the terminals of a source of electricity and adapted to close circuits through said source and coils, and means for shifting the hook-board to break the connections formed by such hooks, as and for the purpose set forth.

49. In a linotype-machine having a series of matrices assembled and adjusted by the operation of keys controlling electric circuits corresponding to the said matrices, the combination, with the circuit-wires, of a keyboard having a series of keys mounted thereon by means of elastic metallic springs, the keyboard being composed of conductive plates insulated from each other, each of said plates being in connection with one of the terminals, of a source of electricity and with one of the said keys, the keyboard being pierced beneath the keys, and each key having a key-hook projected downward through the keyboard, and a hook-board of non-conductive material arranged movably below such keyboard and having a series of hooks connected with electrically-operated devices for assembling and adjusting the matrices and adapted to engage the key-hooks when depressed and close circuits through said devices, a spring actuating the hook-board to hold the hooks normally disengaged, a latch-lever pivotally connected with the hook-board and having a hinged tailpiece to engage a stop, a revolving catch, and a tooth upon the latch-lever to engage the same to retract the hook-board to render the hooks operative, a releasing-magnet, and an armature upon such latch-lever adapted when said magnet is energized to detach the tailpiece from the stop and permit the spring to return the hook-board to its normal position, substantially as herein set forth.

50. In a linotype-machine having a series of matrices assembled, adjusted and locked by the operation of keys controlling electric circuits corresponding to the matrices, the combination, with the circuit-wires, of a keyboard bearing a conductive plate connected with one of the terminals of a source of electricity and having mounted upon it a series of elastic metallic keys with downwardly-projecting key-hooks, said keyboard being pierced beneath the keys to permit the key-hooks to project downward through the keyboard, and a hook-board of non-conductive material arranged movably below such keyboard bearing a series of hooks connected with electrically-operated devices joined to the other terminal of said source of electricity and operating to lock the matrices, said hooks being adapted to engage the key-hooks when depressed and close circuits through said devices, a spring actuating the hook-board to hold the hooks normally disengaged, a latch-lever pivotally connected with the hook-board and having a hinged tailpiece to engage a stop, a revolving catch and a tooth upon the latch-lever to engage the same to retract the hook-board to render the hooks operative, a releasing-magnet and an armature upon such latch-lever, adapted when said magnet is energized to detach the tailpiece from the stop and permit the spring to return the hook-board to its normal inoperative position, substantially as shown and described.

51. In a linotype-machine having a series of matrices assembled, adjusted and locked by the operation of keys and electric circuits corresponding to the said matrices, the combination, with the circuit-wires, of a keyboard having a series of keys mounted thereon by means of elastic metallic springs, of conductive plates insulated from each other, each of said plates being in connection with one of the terminals of a source of electricity and with one of the said keys, the keyboard being pierced beneath the keys, and each key having key-hooks projected downward through the keyboard, and a hook-board of non-conductive material arranged movably below such keyboard and having a series of hooks adapted to engage the key-hooks when depressed, to close said circuits through electrical devices for assembling, adjusting and locking the matrices; a spring actuating the hook-board to hold the hooks normally disengaged, a revolving catch with connections to the hook-board to retract it against the spring, a latch to lock the hook-board in an operative position, and releasing mechanism to release the hook-board to the operation of the spring, substantially as herein set forth.

52. In a linotype-machine, the combination, with a suitable frame, of the mandrel 4 having a series of matrix-bearing spiders rotatable thereon between fixed collars, means for adjusting the spiders successively, a registering-magnet with connection to the said spiders, a motor-magnet surrounding such registering-magnet and provided with coils corresponding to the spider-arms, circuit connections and keys for changing the "consequent poles" of such motor-magnet, a lock-bar with slot adapted to embrace the spider-arms when alined, gearing for advancing the lock-bar step by step, as the spiders are adjusted, an armature and pawl to operate such gearing, a lock-magnet to actuate the armature and pawl, and a circuit closed upon each actuation of the motor-magnet to energize such magnet and actuate the lock-bar gearing, substantially as herein set forth.

53. In a linotype-machine, the combination, with a suitable frame, of the mandrel 4 having a series of matrix-bearing spiders rotatable thereon between fixed collars, means for adjusting the spiders successively, a registering-magnet with connection to the said spiders, a motor-magnet surrounding such registering-magnet and provided with coils corresponding to the spider-arms, circuit connections and keys for changing the "consequent poles" of such motor-magnet, a lock-bar with slot adapted to embrace the spider-arms when alined, gearing for advancing the lock-bar step by step as the spiders are adjusted, an armature and pawl coöperating with a ratchet to operate such gearing, a lock-magnet to actuate the armature and pawl, a circuit closed upon each actuation of the motor-magnet to energize the lock-magnet, a ratchet with detent to hold the lock-bar when advancing step by step, and a lock-releasing magnet with key and circuit adapted to withdraw the pawl and detent when required to retract the lock-bar from the spiders, substantially as herein set forth.

54. In a linotype-machine, the combination, with a suitable frame, of the mandrel 4 having a series of matrix-bearing spiders rotatable thereon between fixed collars, means for adjusting the spiders successively, a registering-magnet with connection to the said spiders, a motor-magnet surrounding such registering-magnet and provided with coils corresponding to the spider-arms, circuit connections and keys for changing the "consequent poles" of such motor-magnet, a lock-bar with slot adapted to embrace the spider-arms when alined, gearing for advancing the lock-bar step by step as the spiders are adjusted, an armature and pawl to coöperate with a ratchet to operate such gearing, a lock-magnet to actuate the armature and pawl, a circuit closed upon each actuation of the motor-magnet to energize the lock-magnet, a ratchet with detent to hold the rack-bar when advanced step by step, a lock-releasing magnet with a circuit and key to withdraw the pawl and detent, a spring to retract the lock-bar, and a piston and air-check cylinder connected with the lock-bar to effect its retraction gradually.

55. In a linotype-machine, the combination, with a pivotally-mounted melting-pot having a mold integral with its nozzle, of means for pressing the mold upon a line of matrices, a suitable frame supporting a mandrel with a series of slotted matrix-spiders mounted rotatably thereon, a registering-magnet carrying a driving-blade adapted to engage with the slotted spiders to rotate the same, an annular motor-magnet surrounding the registering-magnet and supported movably upon the mandrel by bridges 11$^a$ and 11$^b$ and having a stop, as a rack-bar attached to its periphery, to prevent revolution upon its axis, a slotted lock-bar successively advanced to retain each adjusted spider in adjustment and adapted to support the adjusted matrices against the mold, and supports 14$^d$ and 11$^c$ the one affixed to the bridge 11$^b$ and the other to the motor-magnet, adapted to sustain said lock-bar against the pressure of the mold.

56. In a linotype-machine, the combination, with a pivotally-mounted melting-pot having a mold integral with its nozzle, of means for pressing the mold upon the line of matrices, a suitable frame supporting a mandrel with a series of slotted matrix-spiders mounted rotatably thereon, a registering-magnet carrying a driving-blade adapted to engage with the slotted spiders to rotate the same, an annular motor-magnet surrounding the registering-magnet and supported movably upon the mandrel by bridges and having a stop, as a rack-bar 100 attached to its periphery, to prevent revolution upon its axis, a slotted lock-bar successively advanced to retain each adjusted spider in adjustment and adapted to sustain the adjusted matrices against the mold, the lock-bar having a cross-brace 14$^c$ at its free end, adapted to clear the matrices when advanced, and a lock-support upon the inner side of the annular motor-magnet with ribs adapted to engage the brace upon the lock-bar, and operating to sustain it against the pressure of the mold.

57. In a linotype-machine, the combination, with a pivotally-mounted melting-pot, having a mold integral with its nozzle, of means for pressing the mold upon a line of matrices, a suitable frame supporting a mandrel with a series of slotted matrix-spiders mounted rotatably thereon, a registering-magnet carrying a driving-blade adapted to engage with the slotted spiders to rotate the same, an annular motor-magnet surrounding the registering-magnet and supported movably upon the mandrel by bridges and having a stop, as a rack-bar 100 attached to its periphery to prevent revolution upon its axis, a slotted lock-bar 14 successively advanced to retain each adjusted spider in adjustment and adapted to support the adjusted matrices against the mold, a lock-support 11$^c$ adapted to sustain said lock-bar against the pressure of the mold, a lock-bar-feed mechanism operated step by step by a lock-magnet and electric circuit after the adjustment of each spider, electrical connections from the lock-magnet to circuit-closing brushes and contact-plates with means for moving them automatically in coöperation with said brushes, to successively close said circuit, and thereby advance the lock-bar into engagement with the lock-support after the spiders are adjusted.

58. In a linotype-machine having slotted matrix-spiders, the combination, with a suitable frame, of a mandrel supporting said spiders rotatably, a registering-magnet carrying a driving-blade for engaging and rotating the spiders into adjustment, an annular motor-magnet surrounding the registering-magnet and having coils on its core for shifting its "consequent poles" and operating to rotate the registering-magnet, a lock-bar 14 advanced to retain each adjusted spider in adjustment, a lock-magnet 20 actuating feeding devices for advancing the lock-bar, a releasing-magnet 32 in circuit with the lock-magnet, suitable electric connections and two independent sources of electricity having separate circuits, the one through the coils on the motor-magnet and the other through the lock and releasing magnets, a keyboard carrying a series of keys adapted to direct said circuits each key having three movable metallic parts, two in electrical connection with the terminals of one source the third in electrical connection with one of the terminals of the other source, the free ends of said movable part terminating in key-hooks to make contacts, and a hook-board arranged below the keyboard and provided with hooks adapted to engage the key-hooks to close and direct the said circuits through the motor-magnet coils, and releasing-magnet, substantially as herein set forth.

59. In a linotype-machine having slotted matrix-spiders, the combination, with a suitable frame, of a mandrel supporting said spiders rotatably, a registering-magnet 10 carrying a driving-blade 13 for engaging and rotating the spiders, and a motor-magnet 11 surrounding the registering-magnet and having coils on its core for shifting its "consequent poles," a lock-bar 14 advanced to retain the adjusted spider, a lock-magnet 20 with feeding devices for advancing the lock-bar, a releasing-magnet in circuit with the lock-magnet, suitable electric connections and two independent circuits, the one through the coils on the motor-magnet and the other through the lock and releasing magnets, a keyboard carrying a series of keys to direct the said circuits and provided with key-hooks, a movable hook-board with hooks to engage the key-hooks, a spring to move the hook-board to disengage the hooks, means to reciprocate the hook-board in opposition to the spring and a latch to retain the hook-board when thus shifted, the latch being controlled by the releasing-magnet, a commutator attached to the motor-magnet having contact-bars each in connection with its respective hook, and a rolling contact operating with one of the bars and keys to close the circuit through the releasing-magnet after the adjustment of each spider, substantially as shown and described.

60. In a linotype-machine having magnetically-moved spiders, a motor-magnet, a brake-magnet, a lock-magnet, and a releasing-magnet operated by electric circuits directed and controlled by keys, the combination with a keyboard of a series of keys supported each by a strip of elastic metal movably upon such keyboard, said strip being electrically connected to one of the terminals of a source of electricity and provided with a key-hook adapted to make a contact when depressed, a hook supported free to reciprocate below the key-hook in connection with the other terminal of the source of electricity to engage the key-hook when depressed and operating to direct a current from said source through the lock-magnet and releasing-magnet, and said key having two other movable strips, each connected with one of the terminals of a second source of electricity and likewise terminating in key-hooks adapted to make contacts when depressed, reciprocated hooks to engage with the same when depressed and direct a current from said second source through the motor-magnet, the said primary strip having attached to it a key-head marked with one of the characters employed in composition and operating to retain the other two strips in proper relation to their corresponding hooks, substantially as shown and described.

61. In a linotype-machine, having slotted matrix-bearing spiders rotatably supported upon a mandrel, the combination, with such spiders, of a registering-magnet 10 carrying a driving-blade 13 for engaging the spiders, a motor-magnet 11 actuating the registering-magnet, an iron brake-ring 47ª fixed to the motor-magnet a brake-magnet 44ᵇ coöperating with the brake-ring to check the inertia of the registering-magnet and spiders, a commutator fixed to said brake-ring, having contact-bars and a contact moving coincidently with the brake-magnet and adapted to close the circuit through one of the contact-bars and the brake-magnet, substantially as herein set forth.

62. In an electric linotype-machine having matrix-spiders rotatably supported upon a mandrel, the combination with such spiders, of a motor-magnet, a registering-magnet, the brake-magnet, a locking device with lock-magnet, a releasing-magnet and appropriate circuit connections with a source of electricity and finger-keys for directing the circuits, a commutator, having two sets of contact-bars arranged in concentric circles, and two moving contacts the one bearing upon the outer set of bars and the other upon the inner set of bars and adapted to finally close circuits through and properly direct the current to the electrically-operated braking, locking and releasing mechanism of said linotype-machine, substantially as herein set forth.

63. In an electric linotype-machine having matrix-bearing spiders rotatably supported upon a mandrel, the combination with the motor-magnet 11 mounted movably upon the mandrel, of a returning-spring for returning the magnet to a normal position, a rack and pinion to advance the motor-magnet against the returning-spring, means for actuating the pinion, a detent, operating to retain the motor-magnet when advanced, a returning-magnet 54 for lifting the detent to an inoperative position, a circuit for energizing the returning-magnet, a returning-switch adapted to close said circuit actuated by means moved with the motor-magnet, the said means operating to close the switch when the motor-magnet is at one extreme of its movement to render the detent inoperative, and to open it at the other extreme that the detent may become operative, substantially as shown and described.

64. In an electric linotype-machine having matrix-bearing spiders supported rotatably upon a mandrel, the combination, with the motor-magnet 11 longitudinally movable upon the mandrel, of a returning-spring for returning the motor-magnet to a normal position, a rack and pinion to advance the motor-magnet against the returning-spring, means for actuating the pinion, a detent operating to retain the motor-magnet when advanced, a returning-magnet 54 for lifting the detent to an inoperative position, an air-check cylinder 15 with contacts and a circuit for energizing the returning-magnet, a spring-moved piston $15^a$ to connect the contacts, and a switch in the said circuit adapted to render the motor-magnet-returning mechanism operative or inoperative when required, comprising a non-conductive base with a contact-point $72^c$ near one extremity, a transversely-flexible switch-bar $72'$ pivotally mounted upon such base and having ends $72^a$ $72^e$ slanted toward such pivot, and a dog-pin $11^e$ reciprocated by the motor-magnet into contact with such slanted ends, and operating to shift the switch-bar into or out of contact with the contact-point to close or open the said circuit, as and for the purpose set forth.

65. In an electric linotype-machine having matrix-bearing spiders supported rotatably upon a mandrel, the combination, with the motor-magnet 11 longitudinally movable upon the mandrel, of a returning-spring for returning the motor-magnet to a normal position, a rack and pinion to advance the motor-magnet against the returning-spring, means for actuating the pinion, a detent operating to retain the motor-magnet when advanced, a returning-magnet 54 for lifting the detent to an inoperative position, an air-check cylinder 15 with contacts and a circuit for energizing the returning-magnet, a spring-moved piston $15^a$ to connect the contacts, and a switch in the said circuit adapted to render the motor-magnet-returning mechanism operative or inoperative when required, means reciprocated by the motor-magnet to close the switch, brushes, as 71, in the circuit of the returning-magnet, and means, as the contact 70, operating to finally close the circuit of the returning-magnet, as and for the purpose set forth.

66. In an electric linotype-machine, the combination, with a pile of matrix-bearing spiders mounted rotatably upon a mandrel, of an annular motor-magnet mounted movably upon the mandrel, carrying rotatably attached a registering-magnet 10 bearing a blade 13 adapted to engage the spiders and rotate the same, a lock-bar 14 with electrically-operated lock-feed for advancing it to successively engage the spiders, a brake-ring $47^a$ attached to the motor-magnet, a commutator having contact-bars and attached to the brake-ring, a brake-magnet 44 coöperating with the brake-ring and supported by a hub, an arm $42^a$ fixed to said hub bearing a contact coöperating with the commutator-bars, and a leaf-spring 46 attached at one end to the hub and at the other end connected with the registering-magnet to check the inertia of the same and of the pile of spiders, when the brake-magnet engages the brake-ring, and a contact-spring $42^b$ on the arm of the rolling contact, adapted when coinciding with the leaf-spring to close the circuit therethrough and through the electrical lock-feed mechanism, the said springs jointly operating to secure the proper registry and locking of the desired matrix, substantially as herein set forth.

67. In a linotype-machine having a series of rotatable matrix-bearing spiders with a registering-magnet to adjust the same, and a multipolar motor-magnet for producing consequent poles corresponding to the arms on the spiders, the combination, of the said elements with a keyboard and a series of keys mounted thereon and connected with the terminals of a source of electricity for closing the circuit, the wires $b'$ and $b^2$ forming part of such circuit and united in a single conductor, as $b^4$, for extending around the periphery of the motor-magnet, and such conductor $b^4$ being joined to terminals of the motor-magnet coils $11^c$, substantially as herein set forth.

68. In a linotype-machine, an annular multipolar motor-magnet having pole-pieces at intervals about its circumference and an annular commutator at one end, an annular core carrying a series of coils between the pole-pieces, a series of keys, and conductors $a^*$, $b'$, and $b^2$ to close the circuit through the magnet-coils, the conductors $b'$ and $b^2$ united to form a single conductor, as $b^4$, extended about the periphery of the multipolar motor-magnet, and connected each with one of the magnet-coils $11^c$ by terminals $11^j$, and the conductors $a'$ extended about the multipolar magnet intermediate to the conductors $b^4$, and carried laterally at right angles beneath the same for union with the commutator-sections, substantially as herein set forth.

69. In a linotype-machine having an annular multipolar motor-magnet with pole-pieces at intervals about its circumference, an annular core carrying a series of coils between the pole-pieces, a ring upon the end of the multipolar magnet having insulated commutator-sections upon its side, a series of keys, and conductors $a'$, $b'$, and $b^2$ to close the circuit through the magnet-coils with the conductors $a'$ disposed longitudinally at intervals upon the periphery of the motor-magnet, the combination, with the aforesaid elements, of the branches $a''$ extended partially across the commutator's supporting-ring, and then at right angles about the same in opposite directions, to reach the opposed commutator-bars 43 and $43^a$, the outer half of such branches extending around the periphery of the ring over the inner half, substantially as shown and described.

70. In a linotype-machine, an annular multipolar motor-magnet having pole-pieces at intervals about its circumference, an annular core carrying a series of coils between the pole-pieces, a ring upon the end of the multipolar magnet with insulated commutator-sections upon its side, a series of keys, and conductors $a'$, $b'$ and $b^2$ to close the circuit through the magnet-coils, the conductors $b'$ and $b^2$ united to form a single conductor, as $b^4$, extended about the periphery of the multipolar magnet, and connected each with one of the magnet-coils $11^e$ by terminals $11^j$, and the conductors $a'$ extended about the multipolar magnet intermediate to the conductors $b^4$, and carried laterally at right angles beneath the same to the ring supporting the commutator-sections, each of such conductors $a'$ having two branches disposed upon the periphery of such ring similarly to the conductors $a'$ and $b^4$ upon the motor-magnet, and connected thereby to the required commutator-sections, substantially as herein set forth.

In testimony whereof I have hereunto set my hand in the presence of two subscribing witnesses.

ALFRED W. STORM.

Witnesses:
C. M. STORM,
ALFRED STORM.